(12) United States Patent
Forgeron et al.

(10) Patent No.: US 10,557,217 B2
(45) Date of Patent: Feb. 11, 2020

(54) FIBERS WITH MODIFIED CROSS SECTIONAL PROFILE

(71) Applicant: THE EUCLID CHEMICAL COMPANY, Cleveland, OH (US)

(72) Inventors: Dean Paul Forgeron, Whites Lake (CA); Shannon McNair, Whites Lake (CA)

(73) Assignee: THE EUCLID CHEMICAL COMPANY, Cleveland, OH (US)

( * ) Notice: Subject to any disclaimer, the term of this patent is extended or adjusted under 35 U.S.C. 154(b) by 0 days.

(21) Appl. No.: 15/578,593

(22) PCT Filed: Jun. 2, 2016

(86) PCT No.: PCT/US2016/035470
§ 371 (c)(1),
(2) Date: Nov. 30, 2017

(87) PCT Pub. No.: WO2016/196764
PCT Pub. Date: Dec. 8, 2016

(65) Prior Publication Data
US 2018/0135206 A1 May 17, 2018

Related U.S. Application Data

(60) Provisional application No. 62/169,776, filed on Jun. 2, 2015.

(51) Int. Cl.
| | | |
|---|---|---|
| *D01D 10/02* | (2006.01) | |
| *C04B 16/06* | (2006.01) | |
| *D01D 5/20* | (2006.01) | |
| *D01D 5/253* | (2006.01) | |
| *D02J 1/06* | (2006.01) | |

(52) U.S. Cl.
CPC ......... *D01D 10/02* (2013.01); *C04B 16/0633* (2013.01); *D01D 5/20* (2013.01); *D01D 5/253* (2013.01); *D02J 1/06* (2013.01); *D10B 2321/022* (2013.01); *D10B 2321/0211* (2013.01); *D10B 2505/02* (2013.01)

(58) Field of Classification Search
CPC .......... D01D 10/02; D01D 5/20; D01D 5/253; D10B 2321/022; D10B 2505/02; D10B 2321/0211; C04B 16/0633; D02J 1/06
See application file for complete search history.

(56) References Cited

U.S. PATENT DOCUMENTS

| | | | |
|---|---|---|---|
| 3,791,911 | A | 2/1974 | Yaeger et al. |
| 4,822,451 | A | 4/1989 | Ouderkirk et al. |
| 5,362,542 | A | 11/1994 | Ozawa et al. |
| 5,573,571 | A | 11/1996 | Kopylov et al. |
| 5,669,798 | A | 9/1997 | Koczab |
| 6,042,466 | A | 3/2000 | Matthews et al. |
| 6,309,423 | B2 | 10/2001 | Hayes |
| 6,503,625 | B1 | 1/2003 | Rieder et al. |
| 8,496,861 | B2 | 7/2013 | Kaufmann et al. |
| 2007/0184265 | A1* | 8/2007 | Ranganathan ........ C04B 18/022 428/375 |

FOREIGN PATENT DOCUMENTS

EP     0847845 A1    6/1998

OTHER PUBLICATIONS

International Search Report and Written Opinion from PCT/US16/35470 dated Sep. 6, 2016 (9 pages).

* cited by examiner

*Primary Examiner* — Hui H Chin
(74) *Attorney, Agent, or Firm* — Calfee, Halter & Griswold LLP

(57) ABSTRACT

A method for making a fiber reinforcement with variations in transverse cross section is disclosed. The method includes forming a fiber comprising polymeric material and exposing the fiber to a heat treatment, such that at least a portion of the polymeric material at or near said surface of said fiber is at or above the melting point temperature and substantially all of the polymeric material at or near the core is below the melting point temperature. The method further includes cooling the fiber to a temperature below the melting point temperature.

15 Claims, 23 Drawing Sheets

FIBERS WITH MODIFIED CROSS SECTIONAL PROFILE

CROSS-REFERENCE TO RELATED APPLICATIONS

This application is a U.S. National of International Application No. PCT/US2016/03547, filed Jun. 2, 2016, which claims priority to and the benefit of U.S. Provisional Patent Application No. 62/169,776, filed Jun. 2, 2015, the entire contents of which are incorporated by reference herein.

BACKGROUND

Bulk material, such as concrete, is known to be brittle with low tensile strength, and may crack under low strains. Concrete, as an example, may be reinforced, such as with steel reinforcing bars or discrete fibers to provide post cracking tensile capacity. Such fiber reinforced concrete may include hydraulic cement, water, aggregates, and short, randomly distributed discrete fibers. Discrete fibers can be used to control cracking behavior, improve impact resistance, and improve toughness of concrete. Discrete fibers can increase mechanical properties of concrete by intersecting and transferring load across cracks. Discrete fibers can also increase concrete's resistance to early age plastic shrinkage cracking by increasing strain capacity of fresh concrete.

The ability to transfer loads across cracks is impacted by a fiber's pullout resistance.

Components affecting pullout resistance include physical or chemical adhesion, friction, mechanical anchorage or fiber-to-fiber interlock. To increase pullout resistance, conventional fibers have used mechanical anchorage via hooked, turned ends or dumb-bell shaped ends, or undergo chemical modification to form a chemical bond with the concrete matrix itself. Conventional manufacturing techniques for polymeric fibers include post extrusion steps of fibrillation, crimping and embossing of surfaces to improve the fiber-matrix bond. Such techniques require additional and costly manufacturing steps to impart these surface modifications to the fiber after extrusion of the fiber itself.

Accordingly, there exists a need for a method to produce a fiber with increased pullout resistance by a simple and inexpensive modification to the fiber.

BRIEF SUMMARY

In some exemplary embodiments, a method is provided for making a fiber reinforcement product with variations in transverse cross sections along the length of the filament. The method includes forming a fiber having a surface, a core, and a first transverse cross section, with the fiber comprising substantially axially aligned polymeric material having a melting point temperature. The method further includes exposing the fiber to a heat treatment, such that at least a portion of the polymeric material at or near the surface of the fiber is at or above the melting point temperature and substantially all of the polymeric material at or near the core is below the melting point temperature, wherein the polymeric material at or above the melting point temperature becomes unaligned, forming at least one fiber area having a second transverse cross section greater than the first transverse cross section and at least one fiber area having a third transverse cross section less than the first transverse cross section. The method further includes cooling the fiber to a temperature at or below the melting point temperature.

The heat treatment may include any high velocity heat treatment method and/or any heat treatment method capable of generating a high heat transfer rate to the fiber. Not intending to be limiting, the heat treatment may include one or more of a flame, moving hot air, moving hot liquid, a laser, and the like. In some exemplary embodiments, the polymeric material comprises a polyolefin, such as, for example, polyethylene, polypropylene, nylon, polyester, and polyvinylidene difluoride. In some exemplary embodiments, the polymeric material is polypropylene and the heat treatment temperature is between 800° C. and 3000° C. and the heat treatment time is between 0.015 seconds and 0.3 seconds. In some exemplary embodiments, the polymeric material is polyethylene and the heat treatment temperature is between 800° C. and 3000° C. and the heat treatment time is between 0.015 seconds and 0.35 seconds. In some exemplary embodiments, the polymeric material is polyvinylidene difluoride and the heat treatment temperature is between 800° C. and 3000° C. and the heat treatment time is between 0.1 seconds and 0.4 seconds. In some exemplary embodiments, the polymeric material is a combination of polypropylene and polyethylene and the heat treatment temperature is between 800° C. and 3000° C. and the heat treatment time is between 0.025 seconds and 0.5 seconds.

In some exemplary embodiments, the second transverse cross section is up to about 150% larger than the first cross section and the third cross section is reduced by less than 50% compared to the first cross section.

In some exemplary embodiments, the fiber has a peak pullout load increase when subjected to tension of at least 100% over an otherwise identical fiber that has not been heat treated.

Various exemplary embodiments are directed to a fiber for reinforcing concrete, or other bulk building material. The fiber comprises a polymeric material and further includes a core portion, wherein the polymeric material substantially in a state of general axial alignment, and a surface portion, surrounding the core portion, wherein the polymeric material is substantially in a state of unordered arrangement, forming at least one ridge in the fiber surface. The ridge has a transverse cross section that is greater than the transverse cross section of the fiber without the ridge. The surface portion further includes at least one groove in the fiber surface having a transverse cross section that is less than the transverse cross section of the fiber without the groove.

Various exemplary embodiments are further directed to concrete reinforced with fibers having variations in transverse cross section. The fibers are formed of a polymeric material and include a core portion, wherein the polymeric material is substantially in a state of general axial alignment, and a surface portion, surrounding the core portion, wherein the polymeric material is substantially in a state of unordered arrangement, forming at least one ridge in the fiber surface. The ridge has a transverse cross section that is greater than the transverse cross section of the fiber without the ridge. The surface portion further includes at least one groove in the fiber surface having a transverse cross section that is less than the transverse cross section of the fiber without the groove.

Exemplary embodiments are further directed to a means for reinforcing concrete using fibers with variations in transverse cross section, including forming a fiber having a surface, a core, and a first transverse cross section, the fiber comprising substantially axially aligned polymeric material having a melting point temperature, exposing the fiber to a heat treatment, such that at least a portion of the polymeric material at or near the surface of the fiber is at or above the melting point temperature and substantially all of the polymeric material at or near the core is below the melting point temperature. The polymeric material above the melting point temperature becomes unaligned, forming at least one fiber area having a second cross section greater than the first cross section and at least one fiber area having a third cross section less than the first cross section. The means further includes cooling the fiber to a temperature at or below the melting point temperature.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known materials, structures and methods associated with fiber extrusion, fiber surface treatment, reinforced material, including concrete, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a", "an", and "the" include plural referents unless the content clearly dictates otherwise. It should also be noted that the term "or" is generally employed in its sense including "and/or" unless the content clearly dictates otherwise.

The present disclosure is directed to a method for producing fibers with cross sectional modifications that may be used for reinforcing concrete, or other bulk building material, for example. Fibers may be comprised of polymeric materials, one or more olefins, including such materials as polyethylene (PE), polypropylene (PP), nylon, or polyester, polyvinylidene difluoride (PVDF) or blends thereof, for example. PE may include high density polyethylene as well as low density polyethylene. Such polymeric material for processing according to an embodiment of the invention may be formed by any method for producing a fiber traditionally used by a skilled person in the art. In some exemplary embodiments, the fibers are formed using a melt extrusion process to produce fibers with a high degree of aligned polymeric molecules.

Figure 1:
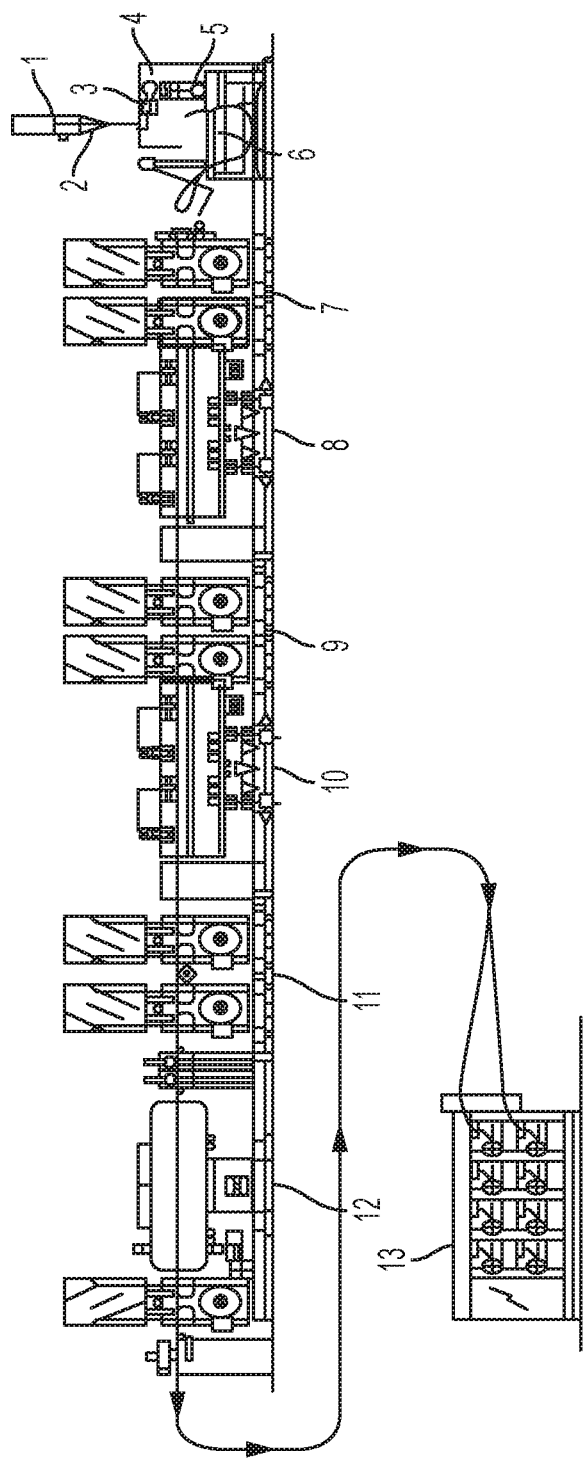
FIG. 1 is a schematic diagram of an extruder line for producing a fiber.

FIG. 1 illustrates an exemplary extruder line having particular settings to produce a fiber of aligned polymeric molecules for post-extrusion treatment. Raw materials for producing a fiber may be purchased as commercially available beads of resin, although other forms of material may be suitable.

In reference to FIG. 1, the polymer (or mixture of polymers) hereinafter referred to as the fiber material may be dropped into a dry mixer (not shown). The fiber material may then be passed through a vacuum system and drawn into the hopper 1 near the top of extruder 4. Feed 3 draws the fiber material into extruder 4 as it is needed. The fiber material is melted as the fiber material is taken into extruder 4 by an extruder auger (not shown) within extruder 4 to draw in, heat and melt, and mix the fiber material to create a viscous fluid, prior to extrusion through die head 5. The melting temperatures of fiber material are well known or can be calculated without experimentation according to well known principles based on the relative mixtures of polymers within the fiber material. The viscous fiber material fluid may then be forced by extrusion auger (not shown) through die head 5 (also known as a spinneret). Die head 5 may include an orifice through which viscous fiber material fluid is extruded. The extrusion auger may comprise a screw, piston, pump, or other pressure imposing element. Die head 5 may have a plurality of orifices, such that the action of forcing the viscous fiber material fluid towards and through die head 5 extrudes one or more fibers in parallel.

When the fiber material is extruded, the resultant fiber will be continuous as more fiber material is extruded. The resultant fiber will have a core region and will have a surface. The fibers may be made into their final conformation, form or shape through a process known in the art as spinning. Methods of spinning generally used may include; wet spinning, dry spinning, gel spinning, and melt spinning. These methods vary in economics for the particular fiber materials used. One example of melt spinning includes solidifying the extruded fiber material by cooling via cooling air or a water bath. Melt spinning is often used for materials that are melted before passing through the die head, such as described herein.

After cooling via the air or water bath, fibers may then pass to spindles, or godets 7, 9, and 11, and one or more stretch ovens 8, 10 where the fibers may be drawn and reheated. The fibers can be heated and godets 7, 9, 11 may be moved or set with speed differential to stretch the fibers to increase the molecular orientation such that the fiber material molecules become aligned with the major axis of the fiber, which runs the length of the fiber as it is extruded. The fiber material molecules become stretched and further aligned along the major axis. This process will result in a high degree of aligned polymeric molecules, which generally has the effect of increasing tensile strength. In the stretch ovens 8, 10, the temperature is changed based on the fiber geometry required for a particular application. The amount of stretching depends on the temperature and the cross-section of the fiber, for example. Such should allow sufficient, slow and low temperature heating of the fiber as the fiber runs through the oven to allow heating though the entire cross section of the fiber to allow mobility of the molecular chains, thus allowing further stretching of the fiber and further alignment of the polymers within the fiber, by godets 7, 9, 11. As fibers with such aligned stretched polymeric molecules cool, the stretched and aligned conformation is locked into the fiber such that at temperatures or application, the fibers maintain the internal stretched polymeric alignment along the fiber major axis.

Polymers such as the constituents of the fiber material disclosed herein are internally structured via strong covalent bonds. For example, a polyethylene polymer is comprised of a plurality of ethylene molecules bonded together covalently. Bonds also exist between polyethylene polymers within a bulk polyethylene material. The polyethylene to polyethylene bond is a relatively weak van der Waals type bond, created by electron clouds surrounding the first polymer interacting with the electron cloud surrounding a second polymer, such electron clouds inducing mutual electric dipoles which then attract one another.

The inter-polymer bonds of other polymer materials may be of a stronger van der Walls type bond where the particular polymer has a permanent electric dipole set up by the conformation of the polymer and distribution of the surrounding electron cloud. For example, PVC polymers have such a permanent dipole resultant in a stronger inter-polymer bond as compared to that of a polyethylene-polyethylene inter-polymer bond. In a bulk polymer material any one polymer may have a van der Waals type inter-polymer bond with a plurality of other polymers.

As is noted above, prior to the extrusion process, polymers in the fiber material may exist in generally uniform random or semi random solid phase or in a crystalline state. In either case, the degree of polymer axial chain orientation is low. In such states, the polymer chain may take up a conformation close to that of a random coil, a state maximizing its conformational entropy and minimizing its free energy. After the extrusion process, the polymer chains become extended, aligned and locked in to create a fiber with a high degree of axial alignment and orientation. Such fibers tend to have smooth surfaces and the extrusion process tends to create fibers of uniform transverse cross section (the transverse cross section being the cross section orthogonal to the major axis of the fiber.

According to some exemplary embodiments of the invention, energy is provided to the extruded and stretched fiber via exposure or emersion in an area of greater thermal energy, such as a heat treatment. For example, the heat treatment may comprise passing the fiber through any type of heat treatment that upon exposure, will heat the fiber starting at the fiber surface. The heat treatment creates a temperature gradient by rapidly heating the fiber surface, while the fiber core remains at a low temperature to prevent melting. Not intending to be limiting, the heat treatment may include one or more of a flame, moving hot air, moving hot liquid, a laser, and any other high velocity heat treatment.

The movement of heat through a solid takes place via heat conduction and occurs as hot, rapidly moving atoms and molecules interact with adjacent atoms and molecules, transferring some of their energy (heat) to these adjacent particles. In other words, heat is transferred by conduction when adjacent atoms vibrate against one another, or as electrons move from one atom to another. Heat transfer from a heated fluid (gas/liquid) to a solid (fiber) is governed primarily by convective heat transfer. There are two general forms of convective heat transfer that can be used to heat a solid: free/normal convection (submerge the solid in a fluid (gas/liquid) that is not moving) and forced convection (gas or fluid is forced to flow over the solid).

It has been found that when two fibers are exposed to the same heat level (temperature), a fiber exposed to a high velocity heat treatment, such as a propane flame (forced convection) results in a variation of increases and decreases in transverse cross section of the fiber at the heat treated area, without degrading the tensile strength of the fiber to a point rendering the fiber too weak, while a fiber exposed to a low intensity heat treatment (free convection) does not. This is due to the rapid heat transfer in forced convection that causes the surface of the fiber to heat up rapidly for a short duration, which concentrates the energy at the surface of the polymer. In contrast, low intensity heat treatment would require an increased exposure time to achieve similar heating of the fiber surface, which would in turn cause increased melting of the entire fiber.

The surface of the fiber at the location of heat treatment appears to take on a rough or rippled appearance where the cross section of the fiber is increased at the location of a ripple and decreased at the location directly before or after the ripple. When the rippled fibers are used as reinforcing fibers for fiber reinforced concrete, the presence of varying larger and smaller cross-sections provide improved mechanical engagement with concrete, increasing pullout resistance.

Conventional fiber manufacturers either have to extrude fibers into various shapes to increase surface area or mechanically deform the fibers along their length during the in line process. Such methods do not alter the cross sectional area of the fiber along the fiber length, but rather the cross sectional shape by creating a deformed fiber surface. For example, some processes dent the fiber surface, which only changes the shape of the cross-section, but not the cross-sectional area.

This difference can be seen when the inventive fibers are cast in concrete, since the concrete will encompass both the larger and smaller cross sections of the fibers. When a fiber with varying cross-sectional areas is pulled out of the concrete, the sections of the fibers having an increased cross sectional area will have to be pulled through a hole formed in the concrete by the sections of the fibers having smaller cross sectional area, thus increasing the resistance of the fiber to pullout.

In some exemplary embodiments, exposing the fiber to a heat treatment with a high heat transfer rate creates a temperature gradient within the fiber, such that the surface of the fiber is heated to a higher temperature than the core. The heat transfer rate is influenced by a combination of temperature, flow rate of the heated fluid (gas or liquid), and properties of the heated fluid (gas or liquid). This rate must be sufficiently high to heat up the surface of the fiber to a temperature that allows mobility of the polymer chains, while maintaining the portion of the fiber material at or near the core at a temperature below the molecular mobility temperature the fiber material. When such a gradient is created, at least some of the uniaxially aligned polymeric chains at or near the surface, which are at a temperature sufficiently high to allow mobility of the molecular chains, tend to relax into a generally random or semi random arrangement. In relaxing from the uniaxially aligned state to the random or semi random arrangement, the individual polymer chains at a molecular level will move from the aligned state to a random coiled shape. The bulk material moving from the uniaxially aligned state to random coiled, isotropic glassy solid state at or near the surface creates the rippled or ridged surface of the fiber, the ripples or ridges altering the cross section of the fiber, both increasing and decreasing the cross sectional area within the fiber sections that have been heat treated. The characteristics of the fiber material depend on the particular fiber material used. Such characteristics include thermal conductivity (k), heat capacity (Cp) and polymer density ($\rho$). These characteristics define a thermal diffusivity:

$$\alpha = \frac{k}{\rho Cp}$$

The thermal diffusivity is a measure, in part, of the material's ability to conduct thermal energy. A material with a low thermal diffusivity will conduct thermal energy poorly. A material with a high thermal diffusivity will conduct thermal energy well.

The material properties for possible fiber materials for surface treatment are known in the art. The material properties for exemplary fiber materials is set out in Table 1, where K is the thermal conductivity, $\rho$ is the polymer density, Tm is the melting point temperature, and Td is the thermal decomposition temperature (the temperature at which the polymeric molecules are broken into smaller constituent parts).

TABLE 1

| | K (W/m · K) | $C_P$ (j/kg/K) | $\rho$ (Kg/m) | Tm (C.) | Td (C.) |
|---|---|---|---|---|---|
| Polypropylene | 0.12 | 1925 | 920 | 170 | 531 |
| Polyethylene | 0.52 | 1850 | 960 | 135 | 506 |
| Nylon | 0.25 | 1670 | 1150 | 268 | 583 |
| polyvinylidene difluoride | 0.12 | 1120 | 1750 | 165 | 340 |

Thermal decomposition may occur by depolymerisation, chain scission, side group elimination, and oxidation, and result from overheating, as at high temperatures the components of the long chain backbone of the polymer can begin to separate and react with one another to change the properties of the underlying polymer, resulting in such undesirable property changes as reduced tensile strength, reduced ductility or increased embrittlement. The amount of thermal energy (in terms of heat treatment time and temperature) should be tuned so as to not result in too much thermal decomposition of the polymers, although a heat treatment temperature at or above the thermal decomposition temperature may be effective, if applied for a sufficiently short time period where the thermal diffusivity of the material prevents the flow of heat throughout the fiber to result in thermal degradation of too great an amount of the fiber.

The amount of thermal energy (in terms of heat treatment time and temperature) should be such that the portion of the fiber material at or near the surface which is at or above the melting point temperature of the fiber material is sufficient to create the desired degree of relaxation, surface modifications and altered cross section. The amount of thermal energy should also be such that the portion of the fiber material at or near the core remains below the melting point temperature such that the polymeric molecules at the core remain substantially aligned, such that the tensile strength of the fiber remains sufficient to have the reinforcement properties described above.

Heat treatment may be conducted in line with the fiber extrusion line, provided the temperature at the core of the fiber has cooled sufficiently that the application of the heat treatment to the fiber will not raise the temperature of the core higher than its melting point temperature. If the heat treatment is provided too early in the extrusion process, the core temperature of the fiber from the extrusion process will still be elevated from the fiber formation process, such that the application of the heat treatment will result in too much of the fiber being above the melting point temperature resulting in too much of the fiber being able to relax to a isotropic state, resulting in a reduction in the tensile strength of the fiber.

For example, the heat treatment may be applied after the fiber has been annealed, or after the fiber emerges from a cooling bath. The heat treatment may be located in-line prior to the fiber being spooled, or after spooling.

The applied heat treatment does not need to be uniform in time or in temperature. The heat treatment can vary in that it may have a thermal profile, a time application profile, fluid (gas or liquid) flow velocity profile, or may be comprised of multiple treatments, such treatments being of a similar thermal profile or differing profiles. In fact, the intensity and velocity of the heat source is important in developing the cross-sectional variations during inline production, due to the difference in heat transfer rate produced by these two effects, which produce different surface heating effects. For example, inline trials with a low velocity flame having an internal temperature of 1200° C. is not equivalent to a 1200° C. flame from a source with a high velocity. Both have approximately the same temperature of flame, but the high velocity heat source provided the improved surface area variations in the surface of the fiber.

Uniform heating may result in a more uniform surface texture of the fiber for fibers of circular cross sections. Uniform heating may result in a more uniform surface texture of the fiber for fibers of cross sections of greater degrees of radial symmetry. For fibers with no radial symmetry, or with low degrees of radial symmetry, it may be preferable to have non-uniform heating or heating tuned to the cross section of the fiber.

Continuous fibers may be treated, but discrete fibers may also be treated. It may be preferable to treat a continuous fiber prior to the fiber being cut into discrete fibers. For a continuous fiber that may be cut into discrete fibers, it may be preferable to pulse the heat treatment such that portions of the fiber are treated and other portions are not. This pulsing of the heat treatment can then align with locations along the fiber where the fiber may be cut into discrete fibers. Such pulsing may result in fibers that have roughened surfaces towards the ends of the discrete fibers and with smooth surfaces towards the center of the fiber, or vice versa, to maximize the desired properties along the length of the discrete fibers, potentially maximizing the pullout resistance qualities at the ends of the fibers while maximizing tensile strength along the middle of the discrete fibers.

The thermal gradient generated from the surface of the fiber to the core of the fiber may be linear or non linear and may not uniformly decrease but may temporarily increase, depending on the heat transfer rate of the heat treatment applied and any local anisotropy of the interior of the fiber or local perturbations in density, for example.

In some exemplary embodiments, the heat treatment is generated by placing an untreated fiber adjacent, proximal or through a propane torch flame such that a particular region of the fiber is heated to a desired temperature. A propane torch burning in air may typically have a temperature profile of between 900 and 1350 degrees Celsius. The temperature profile from the burner nozzle and across the flame profile can be measured using a thermocouple. At a particular distance from the burner nozzle, flame temperatures of between 230 degrees Celsius and 1300 degrees Celsius can be achieved. Higher temperatures (requiring less application time) can be achieved through an oxy-acetylene torch, for example. By measuring the flame width and by passing a fiber adjacently, proximally or through the flame at a particular speed, an exposure time can be calculated, knowing the speed of a point on the fiber as it travels across the flame width.

The temperature should be sufficient to allow the aligned polymers to flow from the aligned state to the unaligned state and should be sufficiently low to avoid flash point or thermal degradation of the polymers. A measure of the amount of flow at a temperature above the melting point temperature is known as the melt flow index.

Figure 2:
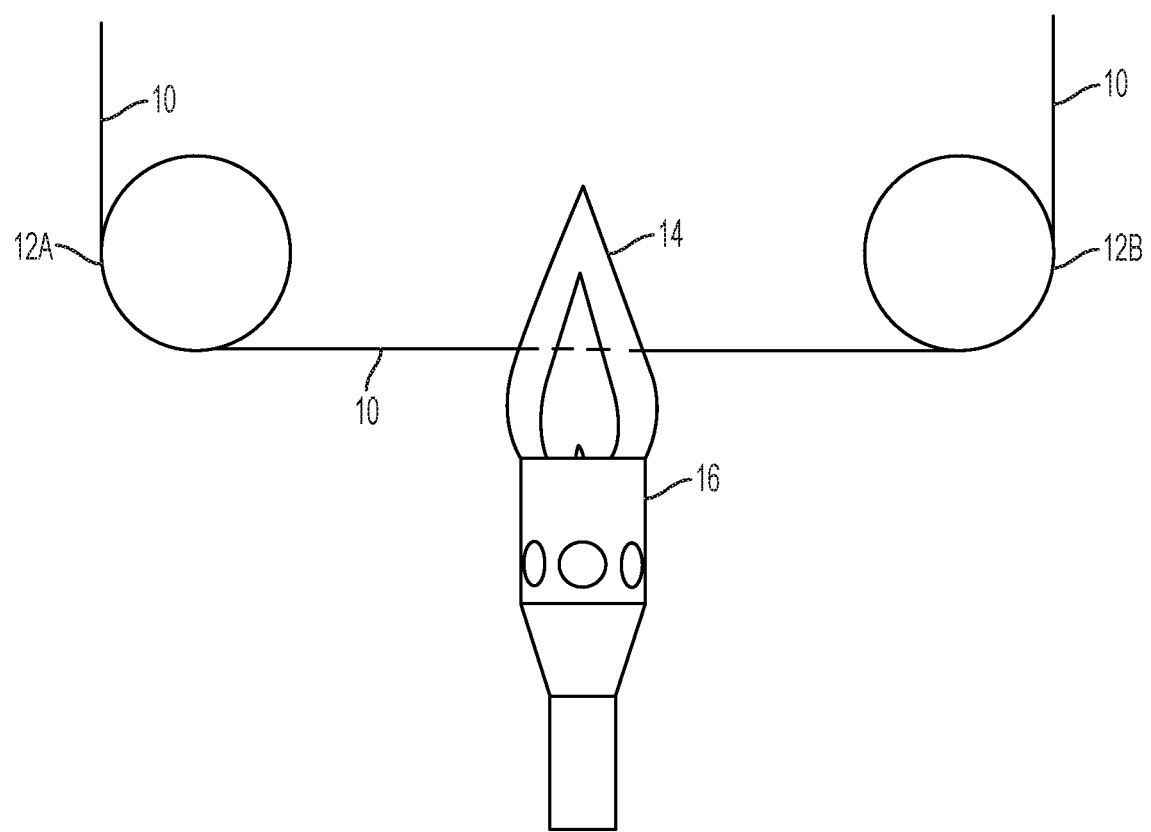
FIG. 2 is a front elevation view of an apparatus for treating a fiber according to one embodiment.

FIG. 2 is a front elevation view of an exemplary apparatus for employing the method(s) disclosed herein. In FIG. 2, a fiber 10 is fed around feed roller 12A and then through a heat source (depicted in this example as a flame 14). Fiber 10 is then fed around take-up roller 12B to be collected. Flame 14 may be generated by a torch nozzle 16, such as a propane torch nozzle fed by a fuel source (not shown), which may be propane or another fuel source, which may be propane or another fuel source such as, for example, butane, methylacetylene-propadiene propane oxygen, oxy-acetylene. The location of the flame 14 as compared to the location of the fiber 10 will define the temperature experienced by the fiber 10 as it passes through flame 14. The width of flame 14 and the speed of fiber 10 as it passes through flame 14 will define the duration of the time period fiber 10 is immersed in flame 14. The speed of fiber 10, the location and shape of flame 14 can be tuned for a particular application.

Figure 3:
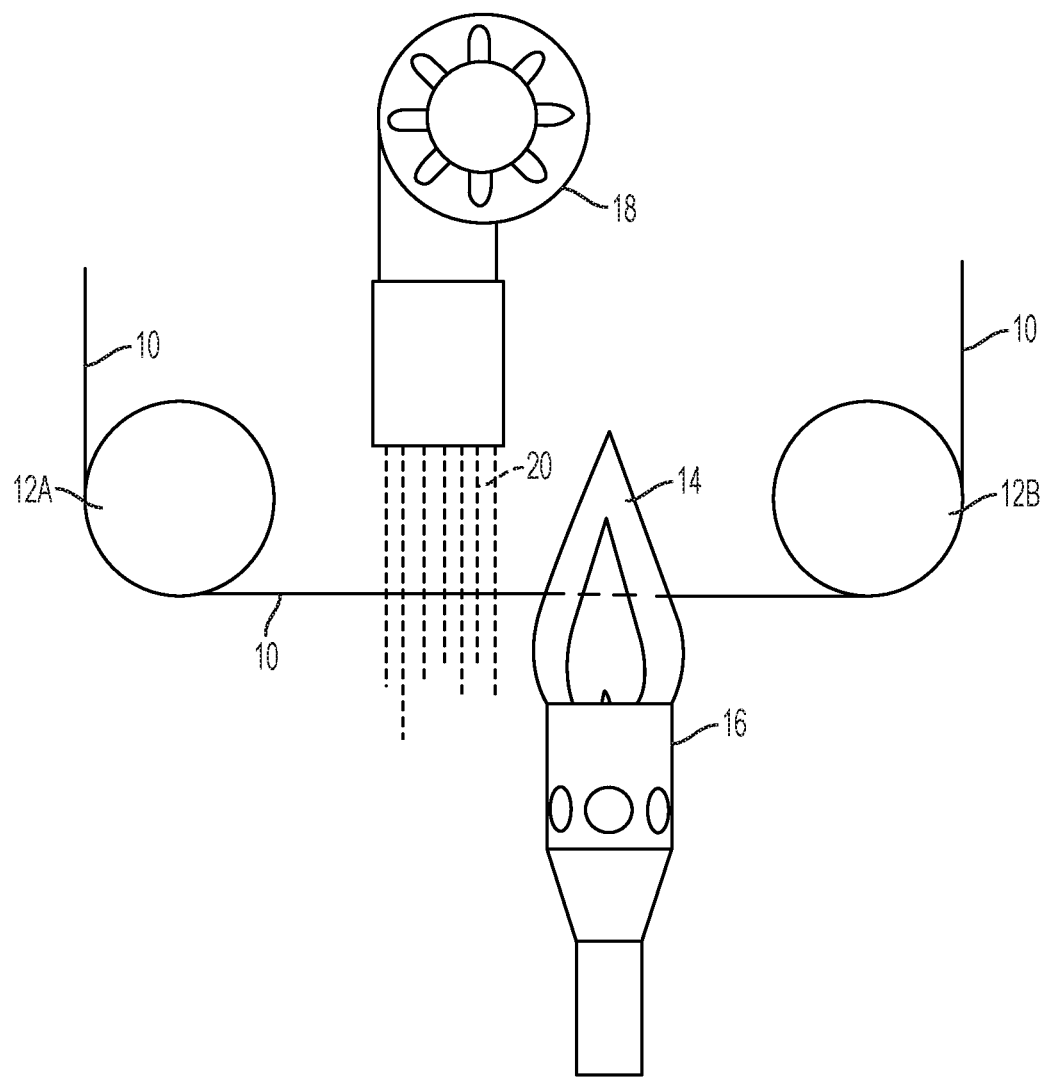
FIG. 3 is a front elevation view of an apparatus for treating a fiber according to one embodiment.

FIG. 3 is a front elevation view of an exemplary apparatus to employ the method disclosed herein. In FIG. 3, a fiber 10 is fed around feed roller 12A then through a plurality of heat sources (depicted as an air jet 18 and flame 14). Fiber 10 is then fed around take-up roller 12B to be collected. Flame 14 may be generated by a torch nozzle 16, such as a propane torch nozzle fed by a fuel source (not shown), which may be propane or another fuel source such as, for example, butane, methylacetylene-propadiene propane oxygen, oxy-acetylene. Air jet 18 may be comprised of a fan flowing over a high temperature resistive heater where the speed of the fan and the amount of current flowing through the resister, and the size of the resister, coupled with the speed of the fiber through the air jet, will determine the thermal energy imparted on fiber 10. In FIG. 3, the flow of heated air is represented by the group of dashed lines 20. The location of the flame 14 and or air jet 18 as compared to the location of the fiber 10 will define the temperature profile experienced by the fiber 10 as it passes through flame 14. The width of flame 14 and air jet 18 and the speed of fiber 10 as it passes through flame 14 and air jet 18 will define the duration of the time period fiber 10 is immersed in the heat treatment. The speed of fiber 10, the location of thermal energy generators such as flame 14 and air jet 18 can be tuned for a particular application. Either flame 14, or air jet 18, or other thermal energy sources, may be used alone, or in conjunction with another, for a particular application, provided the energy imparted to the surface of the fiber is sufficient to obtain the desired effect. Once the fiber has been exposed to the heat treatment, the fiber may be cooled, which sets the polymeric material in whatever aligned or unaligned state it may be in. This locks the surface deformations in place before further handling or mechanical manipulations occur that could flatten the increased cross sections into the decreased cross sections. Cooling the fibers after the heat treatment is used to prevent the radiation of heat into the core of the polymer, which may weaken the core and interfere with typical handling that occurs downstream in the manufacturing process. In some exemplary embodiments, the heat treated fibers are cooled, such as by passing the fibers through a cold water bath or with use of one or more fans. In some exemplary embodiments, the heat treated fibers are cooled using one or more of gas and high velocity gas, including air and other gases; cryogenic liquid, such as liquid nitrogen, hydrogen, oxygen, helium, and the like; a liquid cooling bath, such as a water or other chemical bath; and mist cooling, such as with water or other chemical mist.

In some exemplary embodiments, one or more heat treated fibers are exposed to a cooling treatment at anytime from immediately (about 0.1 seconds) after the heat treatment to about 5 minutes after heat treatment. The amount of cooling time and duration may vary depending on the cooling treatment used. For example, a heat treated fiber may be exposed to cold air or liquid (about −60° C. to 160° C., or from about 15 to 30° C.) during a time frame from immediately after heat treatment (about 0.1 seconds) to about 60 seconds after treatment. The cooling duration may range from about 0.1 seconds to about 5 minutes, or between about 1.0 second to about 1 minute, or between about 2.0 seconds to about 4 seconds.

Figure 4:
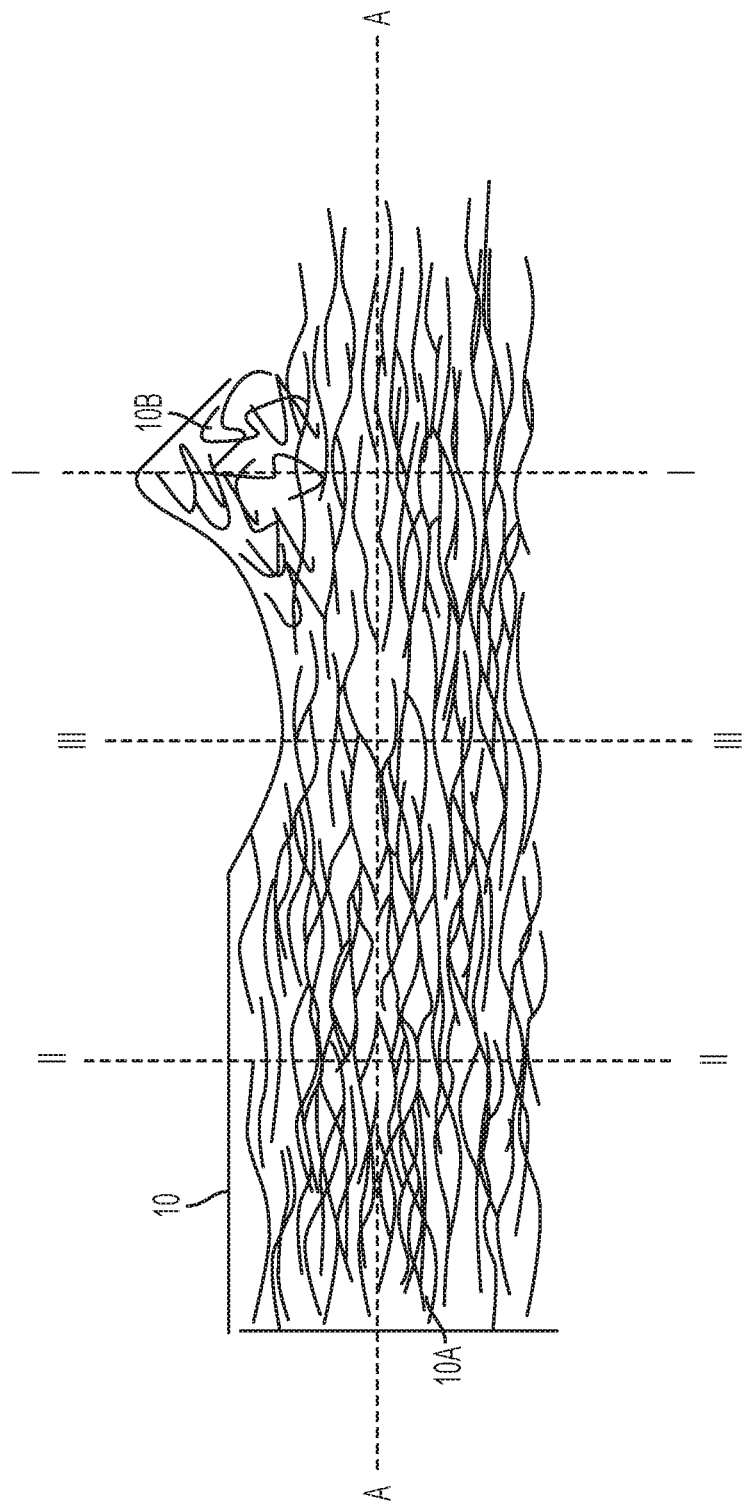
FIG. 4 is a cross-sectional schematic view of a portion of a fiber according to one illustrated embodiment showing a representation of microscopic individual polymeric molecules.

FIG. 4 is a cross-sectional schematic view of a portion of a fiber according to one exemplary embodiment showing a representation of microscopic individual polymeric molecules. FIG. 4 shows a portion of a fiber 10 following heat treatment. Individual polymeric molecules 10A at or near the core of the fiber remain generally stretched and aligned, and are in a high degree of alignment along the major axis of the fiber, referred to hereinafter as an "axially aligned state." The polymers in the axial aligned state contribute significantly to the tensile strength of the fiber. The major axis of the fiber is shown by the dashed line A-A. Individual polymeric molecules 10B at or near the fiber surface have relaxed into a less stretched and less aligned state, or a state of low degree of axial alignment creating a ripple or ridge at the surface of fiber 10. It is believed that the polymers in the relaxed state contribute little to the tensile strength of the fiber. Due to the relaxation of the polymeric material and the formation of the surface ripple, the cross section of the fiber 10 at line I-I is increased as compared to the cross section of the untreated fiber, at line II-II, maintaining the cross-section of the fiber as it was extruded. Further, the relaxation of the polymeric material and the formation of the surface ripple leads to a decrease in the cross section of the fiber 10 at line III-III, as compared to the cross section of the untreated fiber, at line II-II, as material has been pulled back from the fiber in the region of line III-III to form the ripple like structure at line I-I.

Figure 5A:
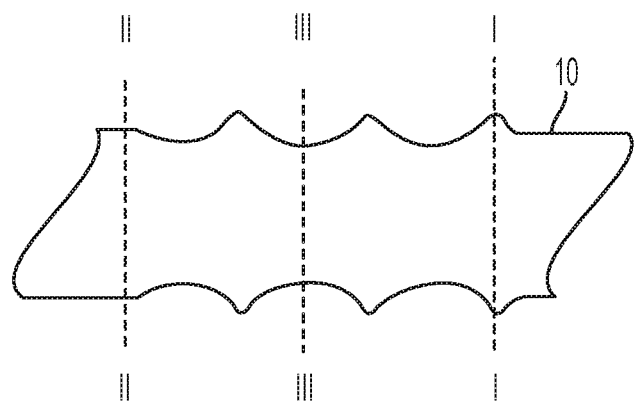
FIG. 5A is a cross-sectional schematic view of a portion of a fiber according to illustrated embodiments.

FIG. 5A is a longitudinal cross-sectional schematic view of a portion of an exemplary fiber. In FIG. 5A, fiber 10 is shown in an untreated area at line II-II. The cross-section at line II-II would be as the fiber was extruded. In certain exemplary embodiments, only the end of continuous fiber is left untreated as it is used to feed around take-up rollers, for example. In other exemplary embodiments, the heat treatment may be pulsed so that portions of the fiber are treated, and other portions of the fiber remain untreated. The portion of the fiber 10 treated with the heat treatment is shown at lines I-I and III-III, taking transverse cross-sections across the fiber 10. At line I-I polymeric fiber material has undergone a change from an aligned state to an unaligned state, the action of which has created the ridged or rippled surface shown in FIG. 5A at line I-I. Material forming the ridged surface is at least in part derived from the portion of fiber 10 shown at line III-III. The transverse cross sectional area at line I-I is greater than the transverse cross-sectional area at line II-II and the transverse cross-sectional area at line III-III. The transverse cross sectional area at line I-I is up to 150% of the untreated fiber cross-section of the untreated fiber (e.g. line II-II) and is greater than the transverse cross-sectional area at line III-III (down to 50% of the untreated fiber cross-section), such that the fiber cross-section may vary by up to 300%. In some exemplary embodiments, the fiber cross-section may vary by an amount greater than 300%. When fiber 10, modified as shown in FIG. 5A, is embedded into concrete, or other cementitious material, the cementitious material will surround fiber 10. Pull out of fiber 10 from the cementitious material will force fiber 10 to deform as the portions of increased cross-sectional are pulled through the areas of lower cross-sectional area, increasing the pullout resistance.

Figure 5B:
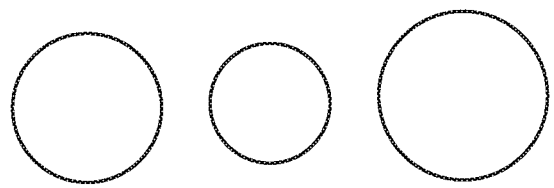
FIG. 5B is a cross-sectional schematic view of a portion of a fiber according to one illustrated embodiment showing a representation of the transverse cross-section of the fiber in FIG. 5A at lines I-I, II-II and III-III

FIG. 5B illustrates series of transverse cross-sectional schematic views of an exemplary fiber showing a representation of the transverse cross-section of the fiber in FIG. 5A at lines I-I, II-II and III-III. The transverse cross-sections in FIG. 5B are shown schematically as circular, but the actual transverse cross-sections would have a shape depending on the shape of the extruder die, and the impact of the treatment described herein, which may result in non-uniform ridge formation or non-uniform transverse cross-sections.

Figure 5C:
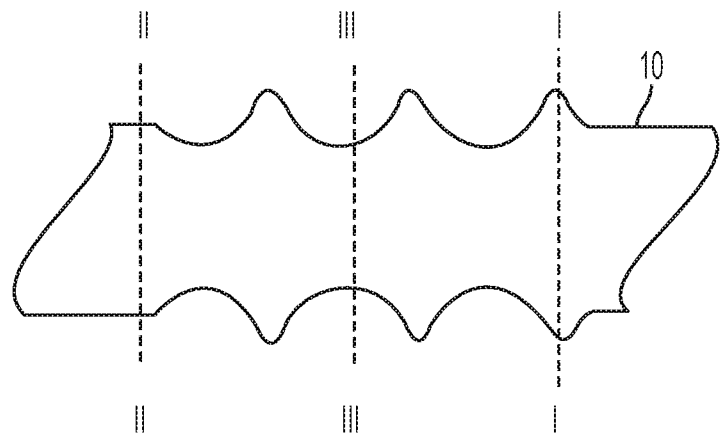
FIG. 5C is a cross-sectional schematic view of a portion of a fiber according to illustrated embodiments.

FIG. 5C is a cross-sectional schematic view of a portion of an exemplary fiber, wherein fiber 10 is as it is in FIG. 5A, only the degree of treatment is greater than that depicted in FIG. 5A, such that at line I-I polymeric fiber material has undergone a change from an aligned state to an unaligned state, the action of which has created the rippled surface shown in FIG. 5C at line I-I. Material forming the rippled surface is at least in part derived from the portion of fiber 10 shown at line III-III of FIG. 5C. The cross sectional area at line I-I of FIG. 5C is greater than the cross-sectional area at line II-II of FIG. 5C and the cross-sectional area at line III-III of FIG. 5C. The cross-sectional area of fiber at line I-I in FIG. 5C is greater than the cross-sectional area of fiber at line I-I in FIG. 5A. The cross-sectional area of fiber at line III-III in FIG. 5C is less than the cross-sectional area of fiber at line III-III in FIG. 5A.

Figure 5D:
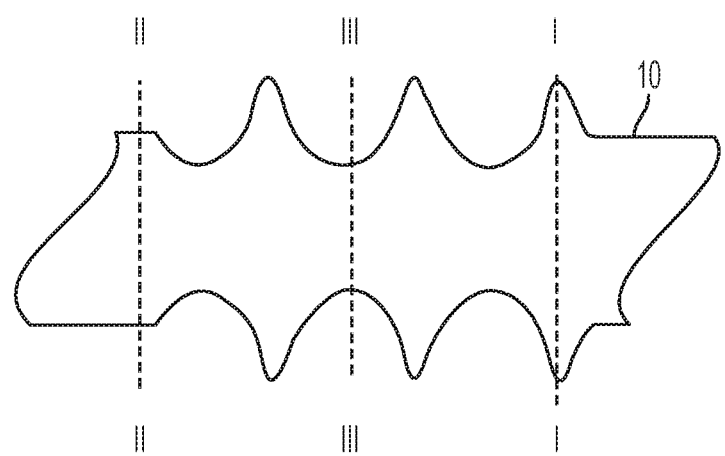
FIG. 5D is a cross-sectional schematic view of a portion of a fiber according to illustrated embodiments.

FIG. 5D is a cross-sectional schematic view of a portion of an exemplary fiber, wherein the fiber 10 is as it is in FIG. 5A, only the degree of treatment is greater than as depicted in both FIG. 5A and FIG. 5C, such that at line I-I polymeric fiber material has undergone a change from the state illustrated in 5C to a further unaligned state, the action of which has created the rippled surface shown in FIG. 5D at line I-I. Material forming the rippled surface is at least in part derived from the portion of fiber 10 shown at line III-III of FIG. 5D. The cross sectional area at line I-I of FIG. 5D is greater than the cross-sectional area at line II-II of FIG. 5D and the cross-sectional area at line III-III of FIG. 5D. The cross-sectional area of fiber at line I-I in FIG. 5D is greater than the cross-sectional area of fiber at line I-I in FIGS. 5A and 5C. The cross-sectional area of fiber at line III-III in FIG. 5D is less than the cross-sectional area of fiber at line III-III in FIGS. 5A and 5D.

The cross-sectional variations can be customized by varying any of a number of factors, such as by maintaining different initial polymer temperatures via cooling the material prior to treatment or varying the post-treatment cooling method (air, chilled air, water, chilled water, high velocity air, etc.).

The alterations to the cross section of the fiber, while maintaining sufficient tensile strength will result in increased pullout resistance of such a fiber in concrete. The effect of the surface treatment can be determined by casting fibers into concrete for pullout testing. A pullout test measures the force required to pull a fiber out of the hardened concrete into which it has been cast. Pullout displacement can be measured for pullout load for both the untreated fiber and the treated fiber. In the pullout tests described herein, a fiber was partially treated (about 10 mm) and partially untreated (15 mm). Both the treated and untreated sections of the fiber were embedded into a concrete sample with the untreated portion extending outwards. A tensile force was applied to the untreated portion of the fiber at several angles relative to the axis of the fiber. In certain instances, the untreated portion failed before the fiber released from the concrete indicating the pullout resistance exceeded the tensile strength of the fiber. The treated fibers of the present invention have an increased pullout resistance compared to untreated fibers. treated

EXAMPLE 1

In a first example, a fiber comprised of polypropylene was created from the method described above. Sample fibers were created and were treated with three flame temperatures F1, F2, and F3, shown in Table 2. The flame heat treatments were from a propane torch (high velocity). Each set of fibers at three flame temperatures were treated for three heat treatment durations T1, T2, and T3, shown in Table 2, to create nine test groups. A control group of fibers was preserved. A number of fibers were tested for each test group. Each of the control fibers and the treated fibers were then cast into concrete for pullout testing at a zero degree angle and at a 45 degree angle. The conditions for creating the treated fibers are described in the Table 2.

TABLE 2

Heat Treatment for 100% Polypropylene Fibers
Table 2

| Group | Heat Treatment Temperature (measured) | Heat Treatment Duration (calculated) |
|---|---|---|
| PP-F1T1 | 900° C. | 0.18 seconds |
| PP-F1T2 | 900° C. | 0.24 seconds |
| PP-F1T3 | 900° C. | 0.30 seconds |
| PP-F2T1 | 1200° C. | 0.09 seconds |
| PP-F2T2 | 1200° C. | 0.12 seconds |
| PP-F2T3 | 1200° C. | 0.15 seconds |
| PP-F3T1 | 1350° C. | 0.06 seconds |
| PP-F3T2 | 1350° C. | 0.1 seconds |
| PP-F3T3 | 1350° C. | 0.135 seconds |
| Control | None. | None. |

Figure 6:
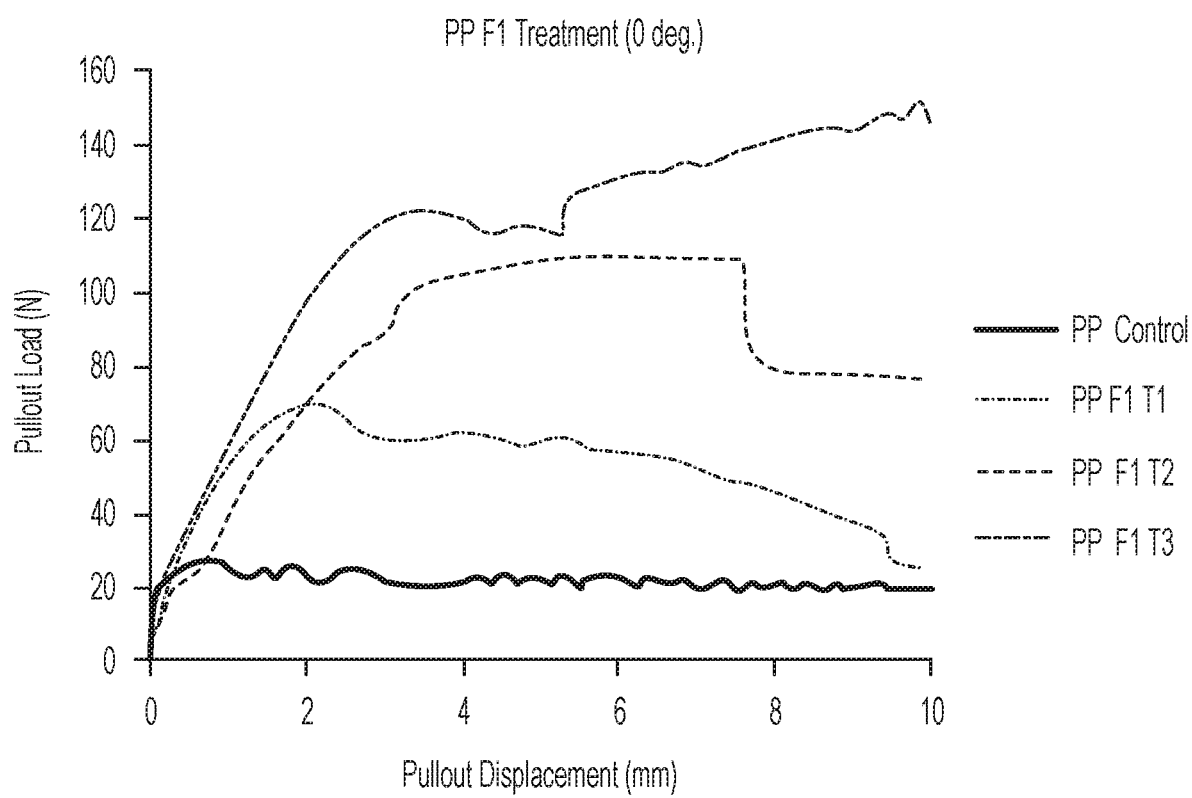
FIG. 6 is a plot of pullout displacement (at zero degrees) in millimeters versus pullout load in Newtons for the PP control samples and for PP samples treated at a measured flame temperature of 900 degrees Celsius.

FIG. 6 is a plot of the pullout displacement (at a zero degree angle) in millimeters versus pullout load in Newtons, illustrating the average of multiple control samples and the average of multiple samples treated at a measured flame temperature of 900 degrees Celsius for calculated times of 0.18, 0.24 and 0.30 seconds. The increased pullout resistance over the control samples can be seen for the treated samples as at a particular distance, the pullout load increased above the control sample.

Figure 7:
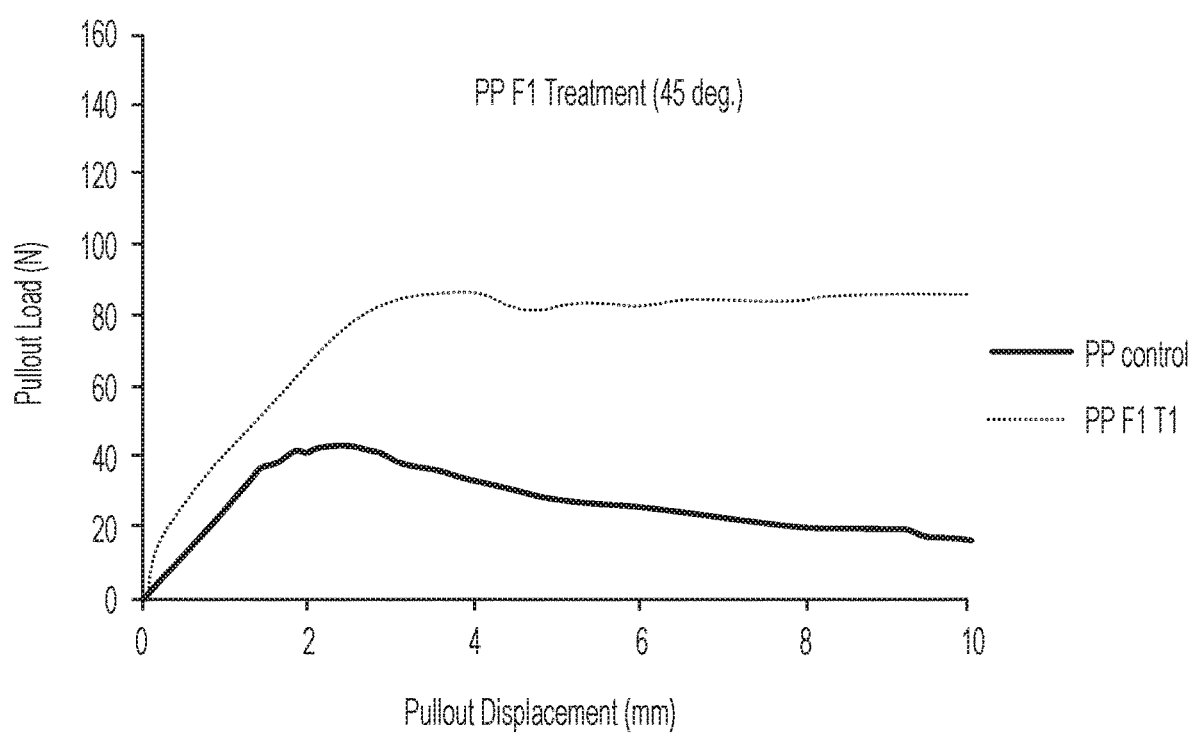
FIG. 7 is a plot of pullout displacement (at zero degrees) in millimeters versus pullout load in Newtons for the PP control samples and for PP samples treated at a measured flame temperature of 1200 degrees Celsius.

FIG. 7 is a plot of pullout displacement (at an angle of 45 degrees) in millimeters versus pullout load in Newtons showing the average of multiple control samples and showing the average of multiple samples treated at a flame temperature of 900 degrees Celsius for a calculated time of 0.18 seconds. The increased pullout resistance over the control samples can be seen for the treated samples as at a particular distance, the pullout load increased above the control sample.

Figure 8:
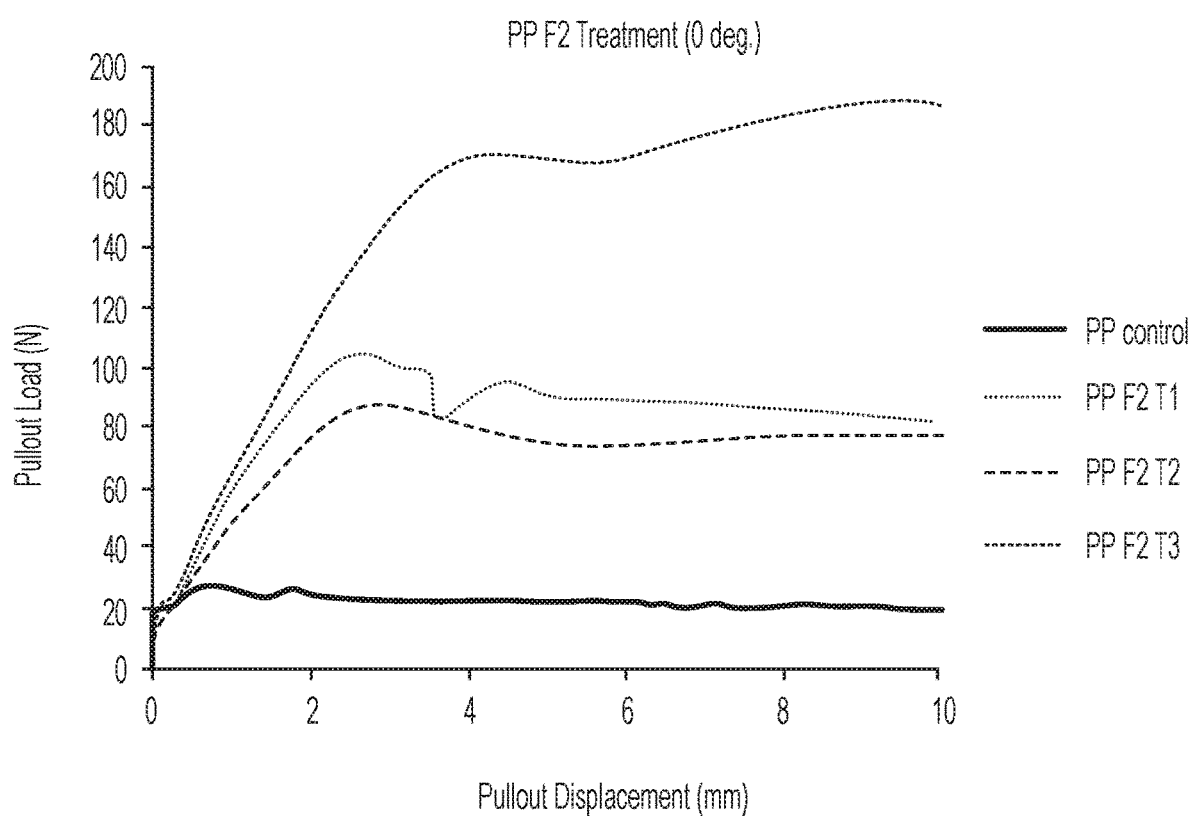
FIG. 8 is a plot of pullout displacement (at zero degrees) in millimeters versus pullout load in Newtons for the PP control samples and for PP samples treated at a measured flame temperature of 1350 degrees Celsius.

FIG. 8 is a plot of pullout displacement (at a zero degree angle) in millimeters versus pullout load in Newtons, illustrating the average of multiple control samples and the average of multiple samples treated at a measured flame temperature of 1200 degrees Celsius for calculated times of 0.09, 0.12 and 0.15 seconds. The increased pullout resistance over the control samples can be seen for the treated samples as at a particular distance, the pullout load increased above the control sample.

Figure 9:
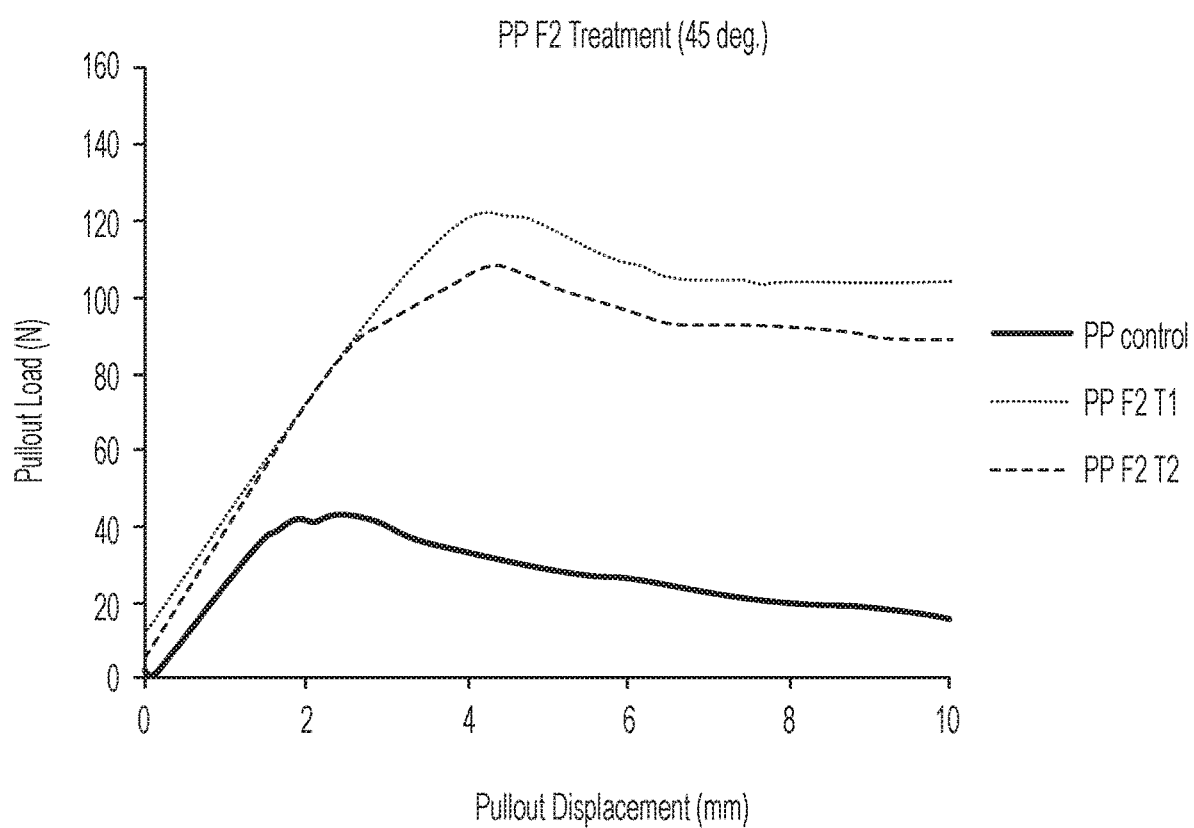
FIG. 9 is a plot of pullout displacement (at 45 degrees) in millimeters versus pullout load in Newtons for the PP control samples and for PP samples treated at a flame temperature of 900 degrees Celsius.

FIG. 9 is a plot of pullout displacement (at an angle of 45 degrees) in millimeters versus pullout load in Newtons showing the average of multiple control samples and showing the average of multiple samples treated at a flame temperature of 1200 degrees Celsius for times of 0.09 and 0.12 seconds. The increased pullout resistance over the control samples can be seen for the treated samples as at a particular distance, the pullout load increased above the control sample.

Figure 10:
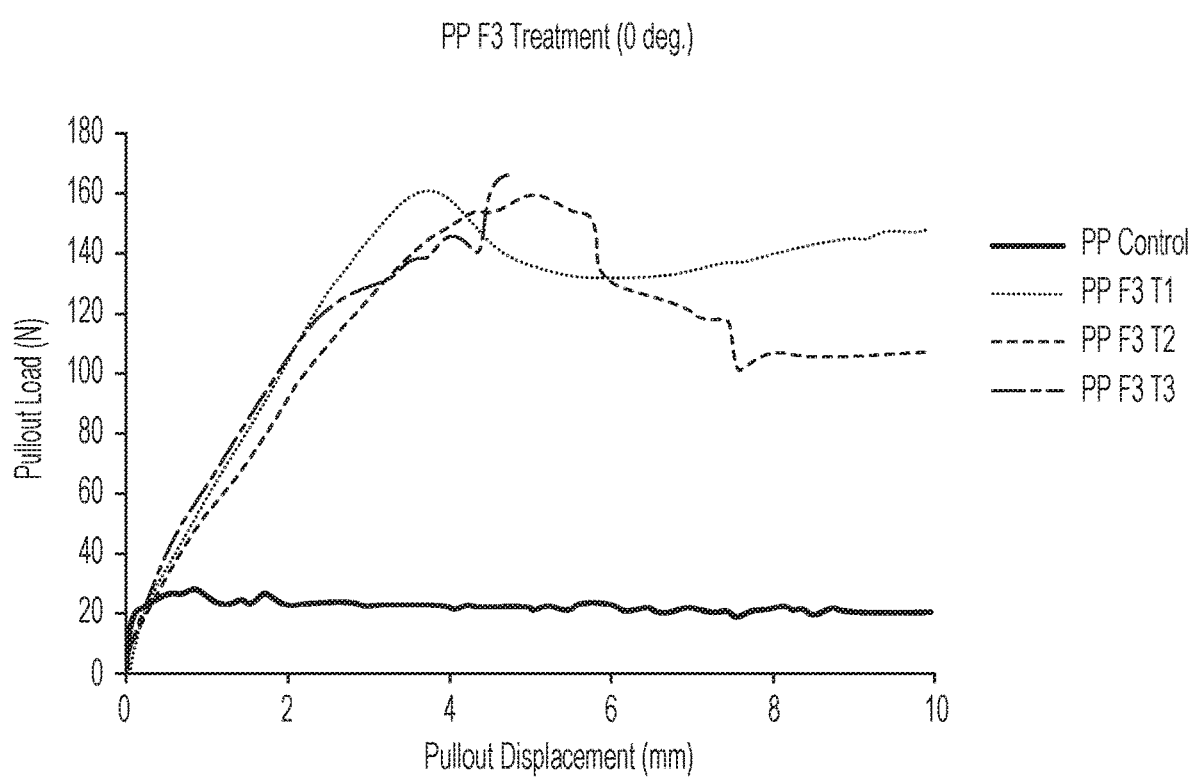
FIG. 10 is a plot of pullout displacement (at 45 degrees) in millimeters versus pullout load in Newtons for the PP control samples and for PP samples treated at a flame temperature of 1200 degrees Celsius.

FIG. 10 is a plot of pullout displacement (at a zero degree angle) in millimeters versus pullout load in Newtons, illustrating the average of multiple control samples and the average of multiple samples treated at a measured flame temperature of 1350 degrees Celsius for calculated times of 0.06, 0.099 and 0.135 seconds. The increased pullout resistance over the control samples can be seen for the treated samples as at a particular distance, the pullout load increased above the control sample.

Figure 11:
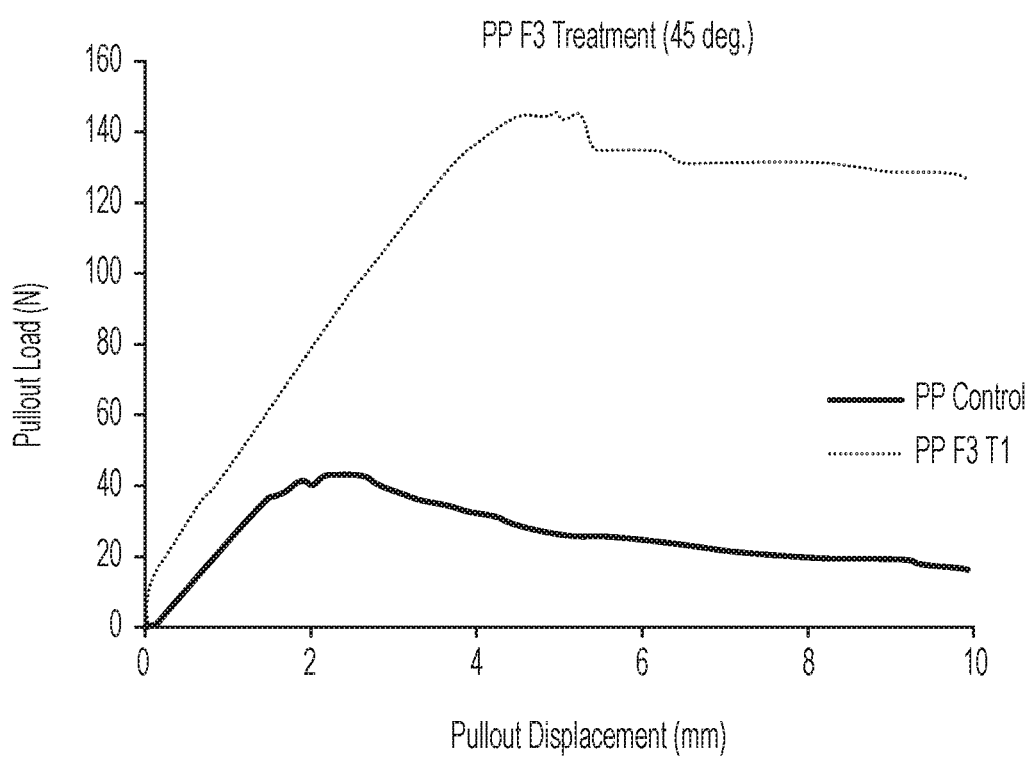
FIG. 11 is a plot of pullout displacement (at 45 degrees) in millimeters versus pullout load in Newtons for the PP control samples and for PP samples treated at a flame temperature of 1350 degrees Celsius.

FIG. 11 is a plot of pullout displacement (at an angle of 45 degrees) in millimeters versus pullout load in Newtons showing the average of multiple control samples and showing the average of multiple samples treated at a flame temperature of 1350 degrees Celsius for a time of 0.06 seconds. The increased pullout resistance over the control samples can be seen for the treated samples as at a particular distance, the pullout load increased above the control sample.

EXAMPLE 2

Sample fibers were created from the method described above comprised of a blend of 75% polypropylene and 25% polyethylene (by weight). The sample fibers were treated at three temperatures. Each set of fibers at the three temperatures were treated at three heat treatment durations to create nine test groups. A control group of fibers was preserved. A number of fibers were tested for each test group. Each of the control fibers and the treated fibers were then cast into concrete for pullout testing at a zero degree angle and at a 45 degree angle. The conditions for creating the treated fibers are described in Table 3.

TABLE 3

Heat Treatment for 75% PP/25% PE fibers
Table 3

| Group | Heat Treatment Temperature (measured) | Heat Treatment Duration (calculated) |
|---|---|---|
| PP/PE-F1T1 | 900° C. | 0.18 seconds |
| PP/PE -F1T2 | 900° C. | 0.24 seconds |
| PP/PE -F1T3 | 900° C. | 0.30 seconds |
| PP/PE -F2T1 | 1200° C. | 0.09 seconds |
| PP/PE -F2T2 | 1200° C. | 0.12 seconds |
| PP/PE -F2T3 | 1200° C. | 0.15 seconds |
| PP/PE -F3T1 | 1350° C. | 0.06 seconds |
| PP/PE -F3T2 | 1350° C. | 0.105 seconds |
| PP/PE -F3T3 | 1350° C. | 0.12 seconds |
| Control | None. | None. |

Figure 12:
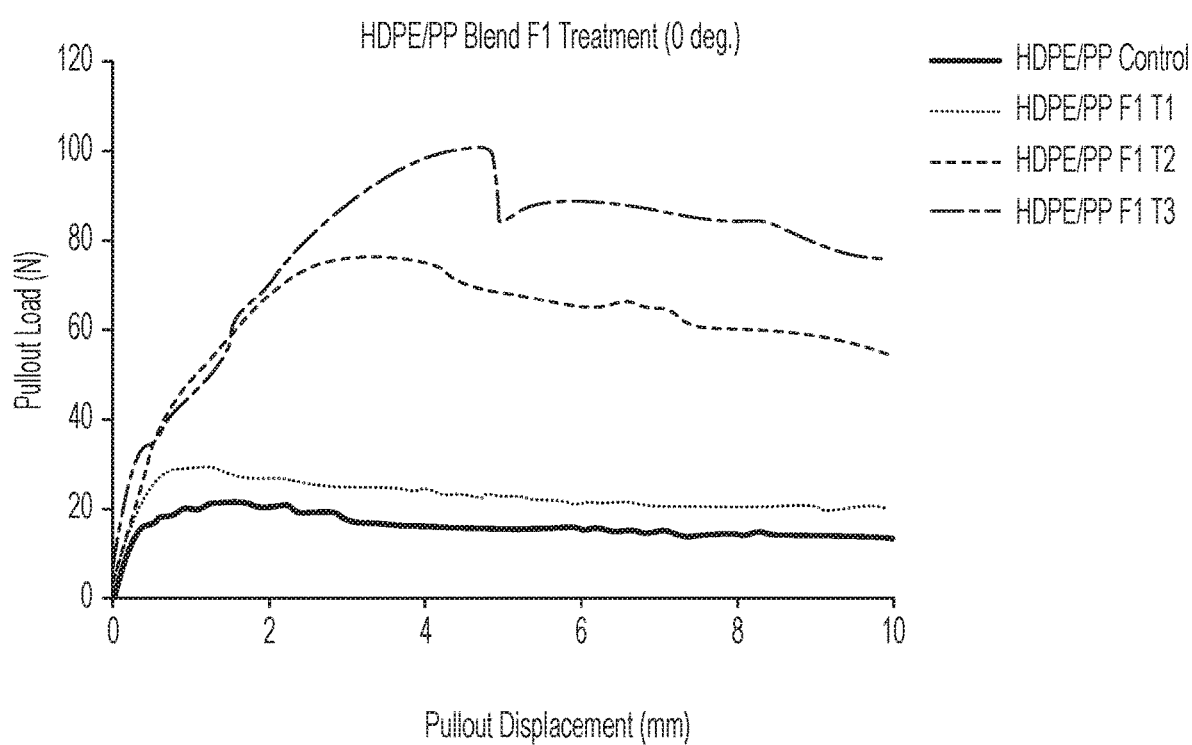
FIG. 12 is a plot of pullout displacement (at zero degrees) in millimeters versus pullout load in Newtons for the control samples and for samples treated at a measured flame temperature of 900 degrees Celsius.

FIG. 12 is a plot of pullout displacement (at zero degrees) in millimeters versus pullout load in Newtons, illustrating the average of multiple control samples and the average of multiple samples treated at a measured flame temperature of 900 degrees Celsius for calculated times of 0.18, 0.24 and 0.30 seconds. The increased pullout resistance over the control samples can be seen for the treated samples as at a particular distance, the pullout load increased above the control sample.

Figure 13:
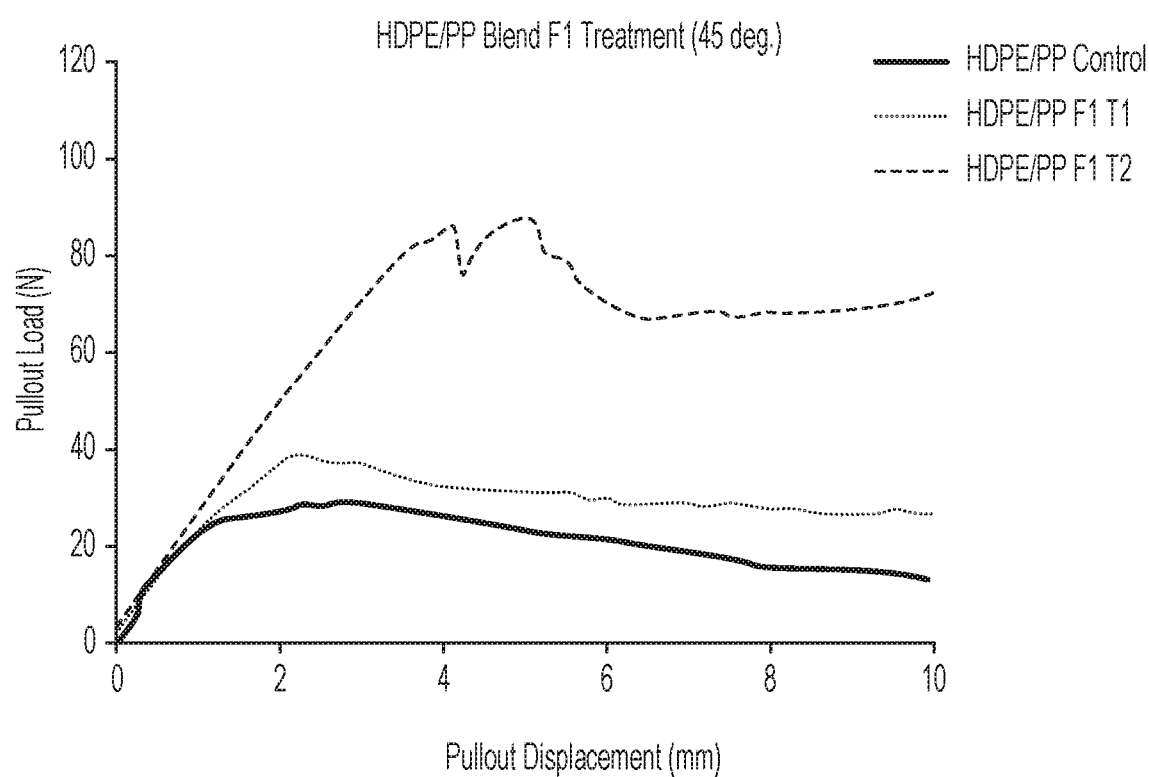
FIG. 13 is a plot of pullout displacement (at zero degrees) in millimeters versus pullout load in Newtons for the control samples and for samples treated at measured flame temperatures of 1200 degrees Celsius.

FIG. 13 is a plot of pullout displacement (at 45 degrees) in millimeters versus pullout load in Newtons, illustrating the average of multiple control samples and the average of multiple samples treated at a measured flame temperature of 900 degrees Celsius for a calculated time of 0.18 seconds. The increased pullout resistance over the control samples can be seen for the treated samples as at a particular distance, the pullout load increased above the control sample.

Figure 14:
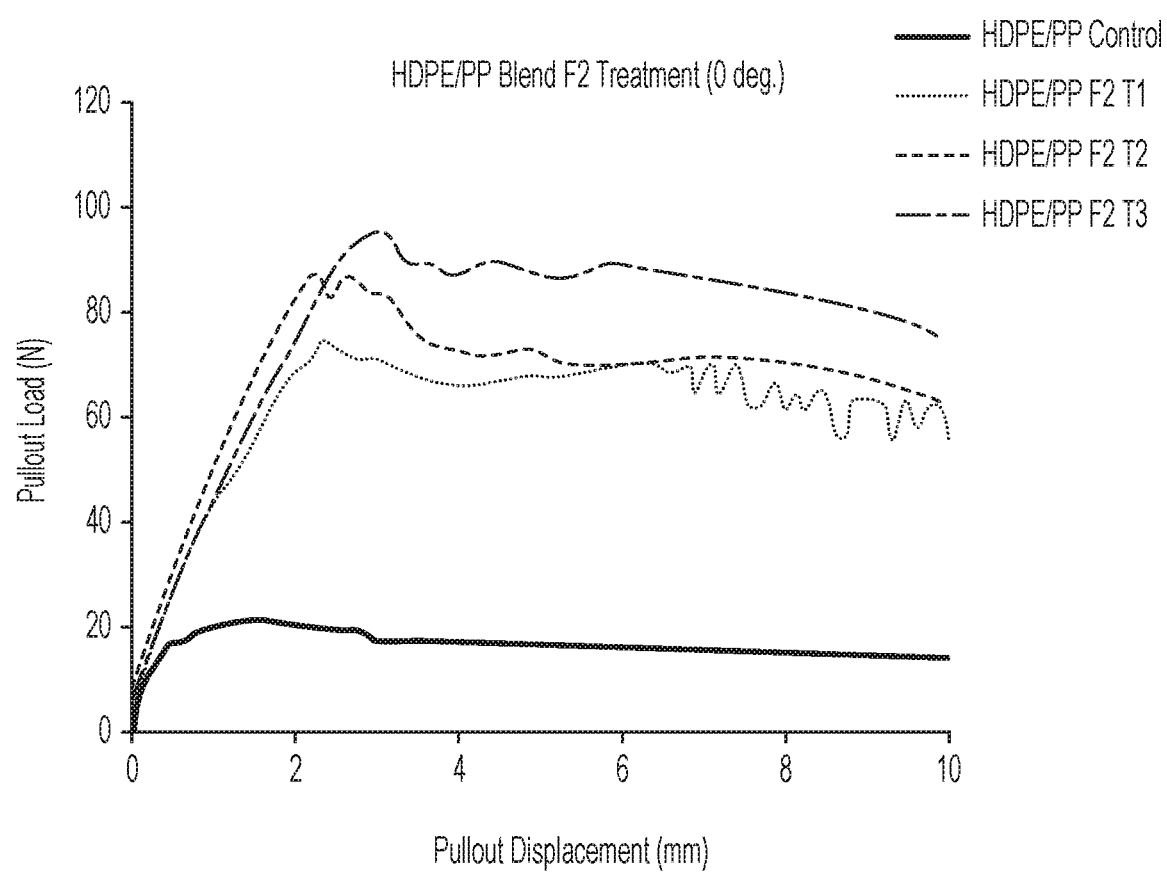
FIG. 14 is a plot of pullout displacement (at zero degrees) in millimeters versus pullout load in Newtons for the control samples and for samples treated at a measured flame temperature of 1350 degrees Celsius.

FIG. 14 is a plot of pullout displacement (at zero degrees) in millimeters versus pullout load in Newtons, illustrating the average of multiple control samples and the average of multiple samples treated at measured flame temperatures of 1200 degrees Celsius for times of 0.09, 0.12 and 0.15 seconds. The increased pullout resistance over the control samples can be seen for the treated samples as at a particular distance, the pullout load increased above the control sample.

Figure 15:
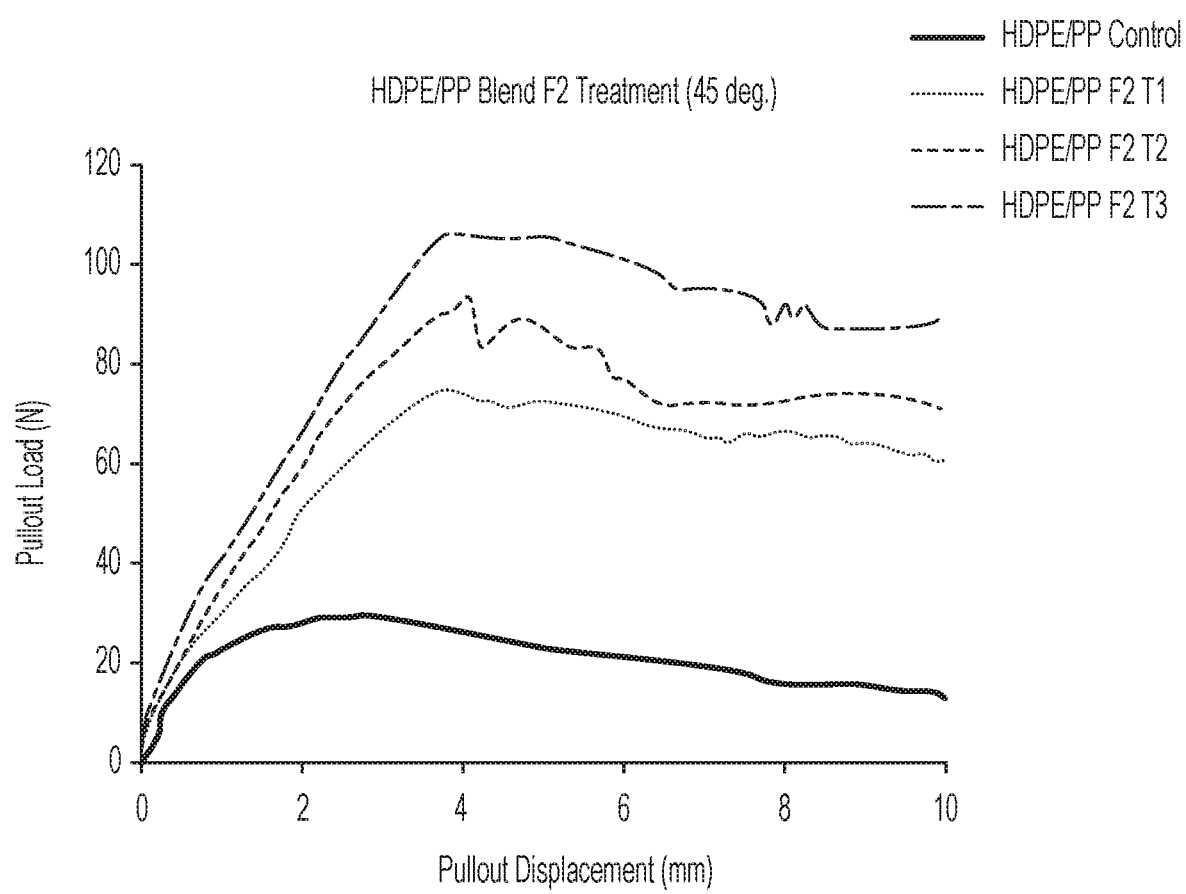
FIG. 15 is a plot of pullout displacement (at 45 degrees) in millimeters versus pullout load in Newtons for the control samples and for samples treated at a measured flame temperature of 900 degrees Celsius.

FIG. 15 is a plot of pullout displacement (at 45 degrees) in millimeters versus pullout load in Newtons, illustrating the average of multiple control samples and the average of multiple samples treated at a measured flame temperature of 1200 degrees Celsius for calculated times of 0.09 and 0.12 seconds. The increased pullout resistance over the control samples can be seen for the treated samples as at a particular distance, the pullout load increased above the control sample.

Figure 16:
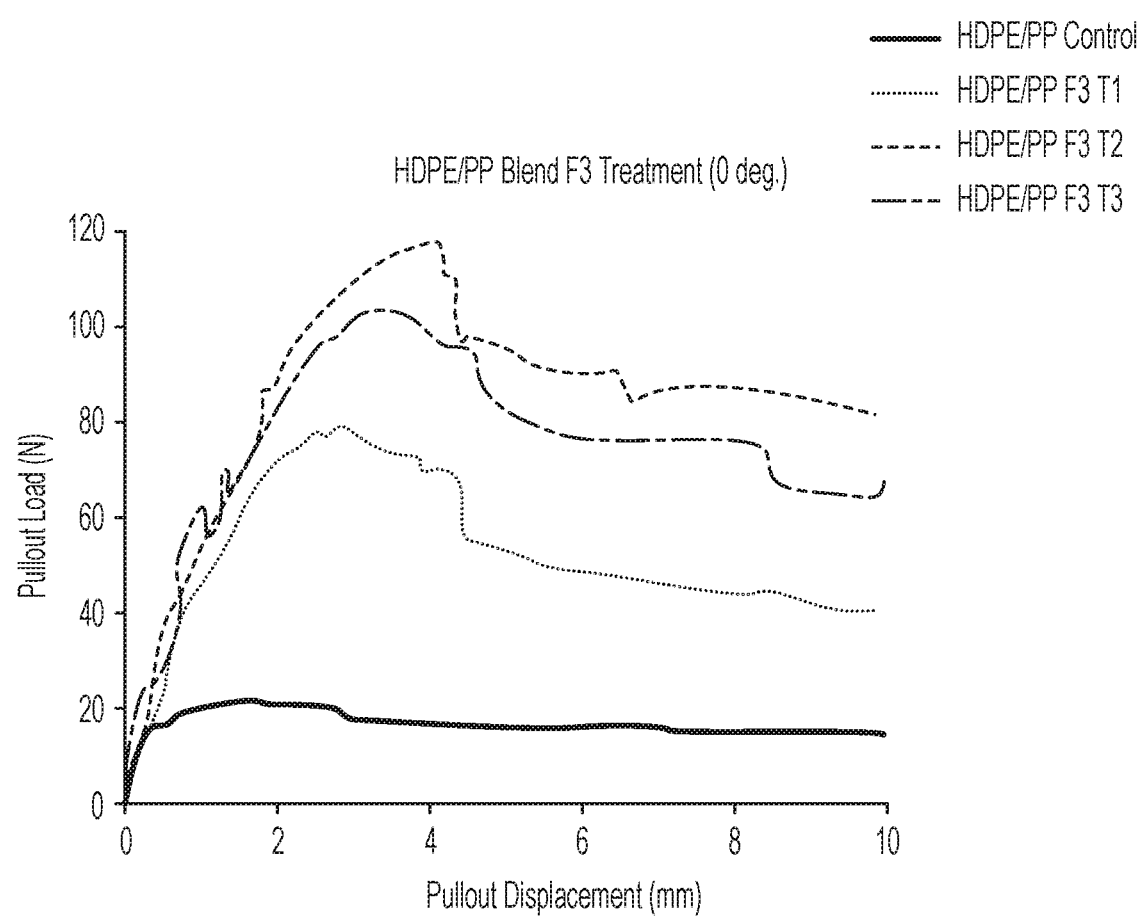
FIG. 16 is a plot of pullout displacement (at 45 degrees) in millimeters versus pullout load in Newtons for the control samples and for samples treated at a measured flame temperature of 1200 degrees Celsius.
Figure 17:
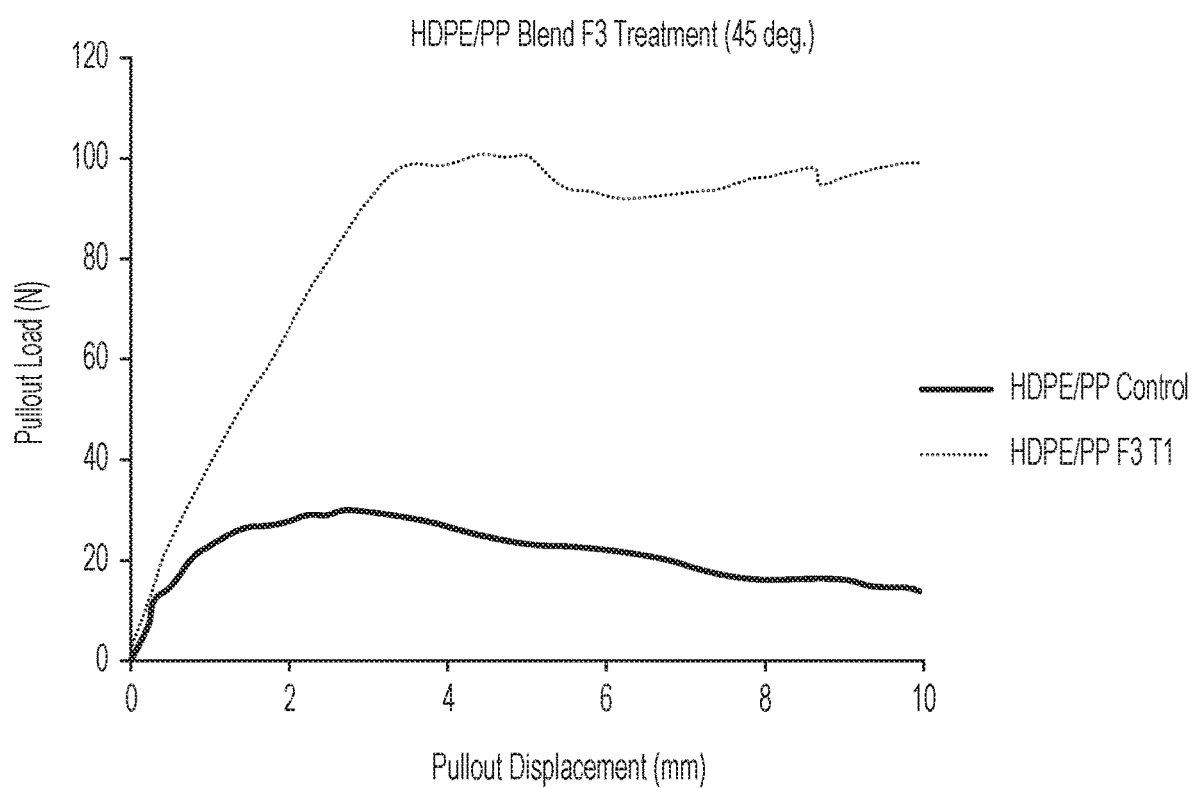
FIG. 17 is a plot of pullout displacement (at 45 degrees) in millimeters versus pullout load in Newtons for the control samples and for samples treated at a measured flame temperature of 1350 degrees Celsius.

FIG. 16 is a plot of pullout displacement (at zero degrees) in millimetres versus pullout load in Newtons, illustrating the average of multiple control samples and the average of multiple samples treated at a measured flame temperature of 1350 degrees Celsius for calculated times of 0.06, 0.105 and 0.12 seconds. The increased pullout resistance over the control samples can be seen for the treated samples as at a particular distance, the pullout load increased above the control sample FIG. 17 is a plot of pullout displacement (at 45 degrees) in millimeters versus pullout load in Newtons, illustrating the average of multiple control samples and the average of multiple samples treated at a measured flame temperature of 1350 degrees Celsius for a calculated time of 0.06 seconds. The increased pullout resistance over the control samples can be seen for the treated samples as at a particular distance, the pullout load increased above the control sample.

Further testing was conducted to determine the range of temperatures and times that generate the desired effect for various fiber materials. The ranges of temperatures and times for various fiber materials set bounds for the desired effect. A person of ordinary skill in the art will be able to achieve the desired effect for other fiber materials or other fiber material combinations based on this data, without experimentation. The test data below described the bounds of ranges of times and temperatures on sample fibers.

Table 4 shows an exemplary range of temperatures and times to produce the effect, setting bounds of the ranges of temperatures and times that produce the desired effect for 100% polypropylene fibers.

TABLE 4

Treatment Settings for 100% PP fibers

| Temperature (° C.) | Treatment Time (s) |
|---|---|
| 800 | 0.1-0.3 |
| 1200 | 0.08-0.25 |
| 3000 | 0.015-0.05 |

Table 5 shows an exemplary range of temperatures and times to produce the effect, setting bounds of the ranges of temperatures and times that produce the desired effect for 100% HDPE fibers.

TABLE 5

Treatment Settings for 100% HDPE fibers

| Temperature (° C.) | Treatment Time (s) |
|---|---|
| 800 | 0.1-0.35 |
| 1200 | 0.08-0.3 |
| 3000 | 0.015-0.07 |

Table 6 shows an exemplary range of temperatures and times to produce the effect, setting bounds of the ranges of temperatures and times that produce the desired effect for 100% PVDF fibers.

TABLE 6

Treatment Settings for 100% PVDF fibers

| Temperature (° C.) | Treatment Time (s) |
|---|---|
| 800 | 0.2-0.4 |
| 1200 | 0.18-0.35 |
| 3000 | 0.1-0.17 |

Table 7 shows an exemplary range of temperatures and times to produce the effect, setting bounds of the ranges of temperatures and times that produce the desired effect for fibers comprised of 75% polypropylene and 25% polyethylene.

TABLE 7

Treatment Settings for 75% polypropylene
and 25% polyethylene fibers

| Temperature (° C.) | Treatment Time (s) |
|---|---|
| 800 | 0.08-0.5 |
| 1200 | 0.07-0.4 |
| 3000 | 0.025-0.1 |

Table 8 shows an exemplary range of temperatures and times to produce the effect, setting bounds of the ranges of temperatures and times that produce the desired effect for fibers comprised of 65% polypropylene and 25% polyethylene and 10% PVDF.

TABLE 8

Treatment Settings for 65% PP, 25% PE, and 10% PVDF fibers

| Temperature (° C.) | Treatment Time (s) |
|---|---|
| 800 | 0.12-0.55 |
| 1200 | 0.1-0.45 |
| 3000 | 0.03-0.15 |

Figure 18:
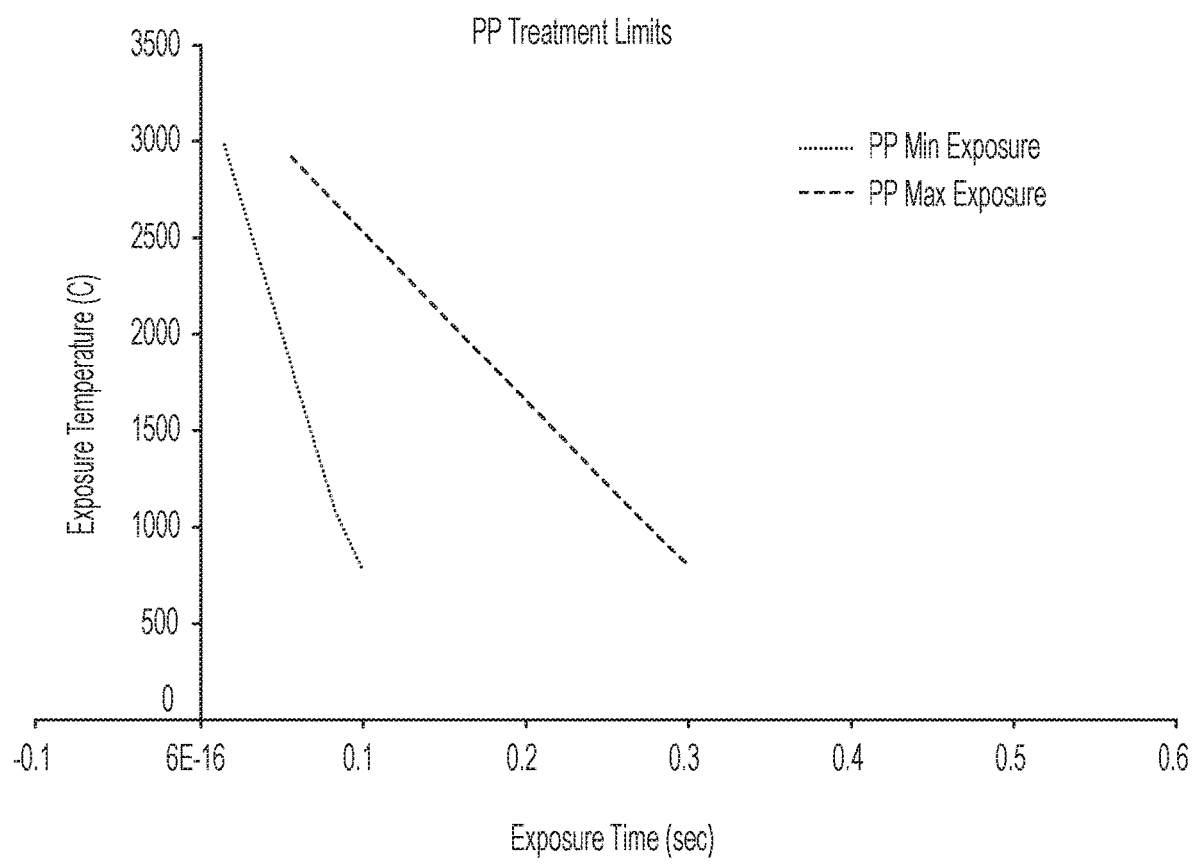
FIG. 18 is a plot of exposure time and exposure temperature of the data in Table 5.
Figure 19:
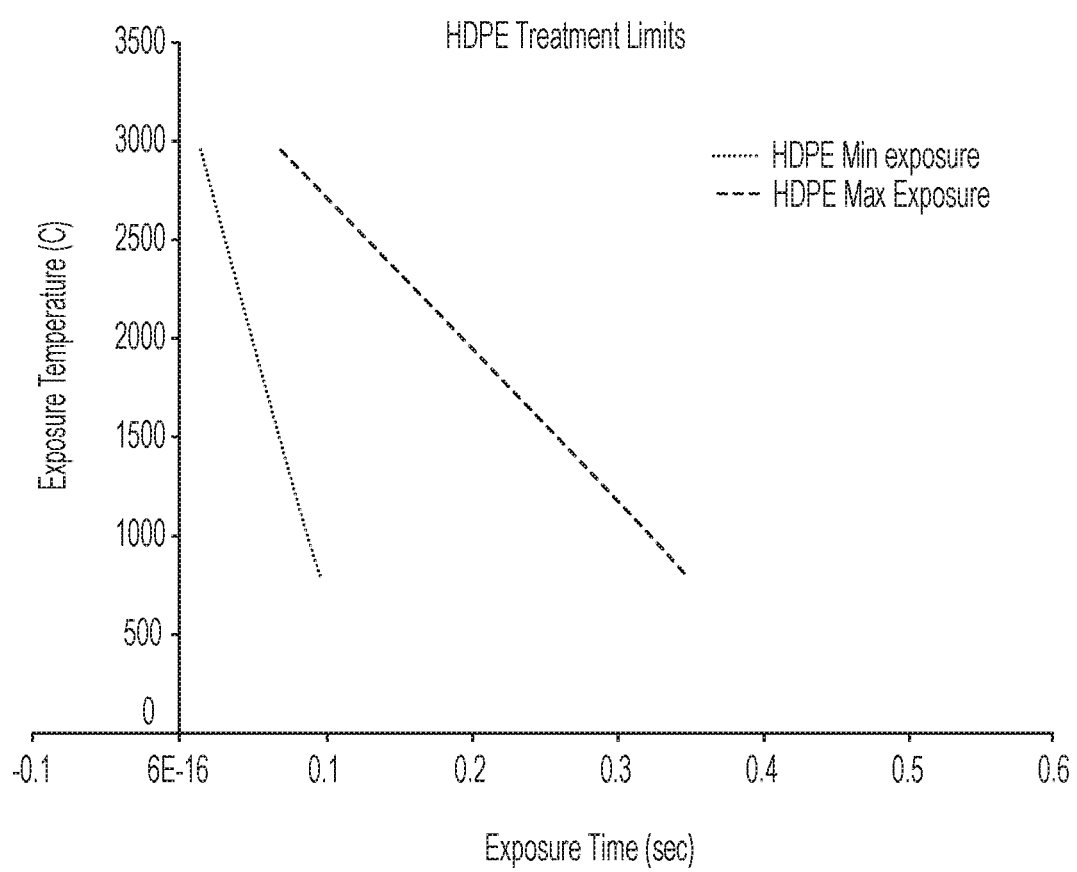
FIG. 19 is a plot of exposure time and exposure temperature of the data in Table 6.
Figure 20:
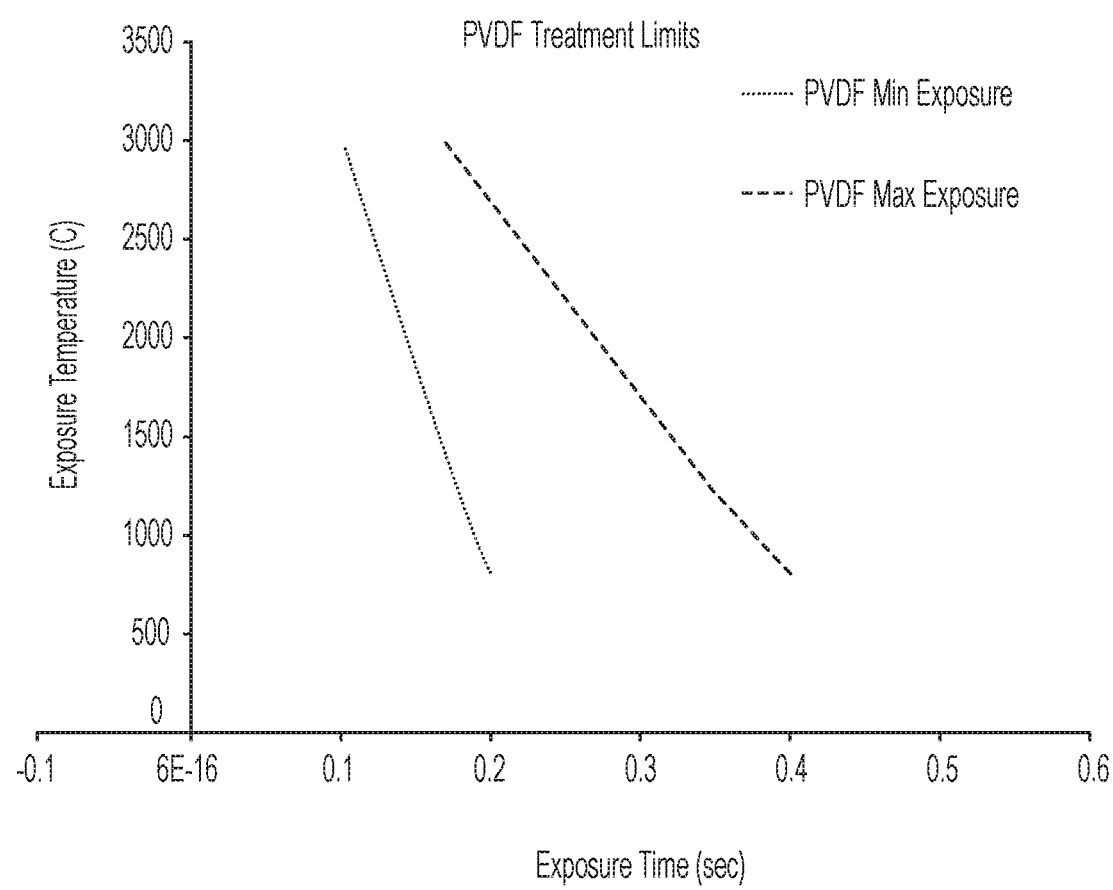
FIG. 20 is a plot of exposure time and exposure temperature of the data in Table 7.
Figure 21:
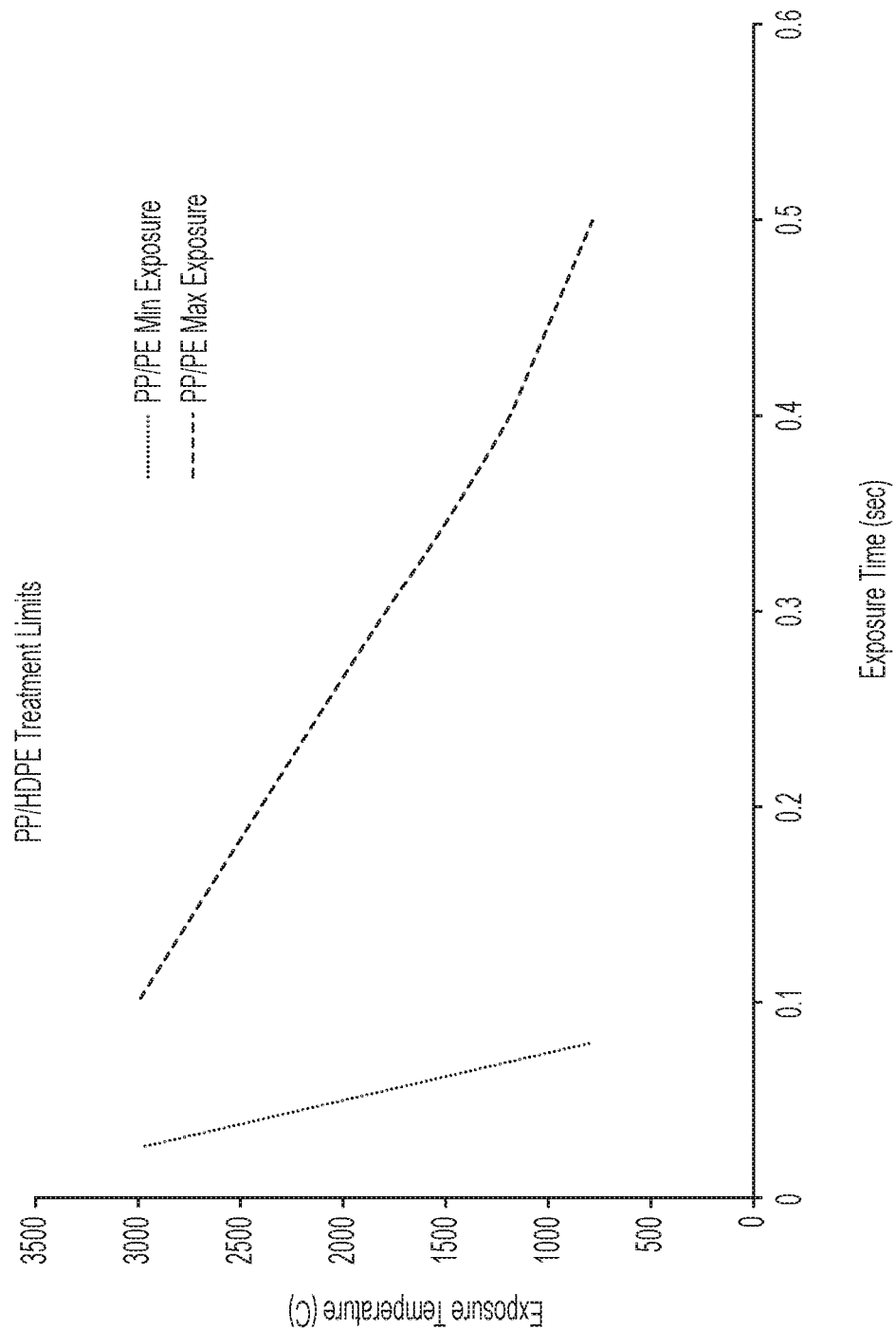
FIG. 21 is a plot of exposure time and exposure temperature of the data in Table 8.
Figure 22:
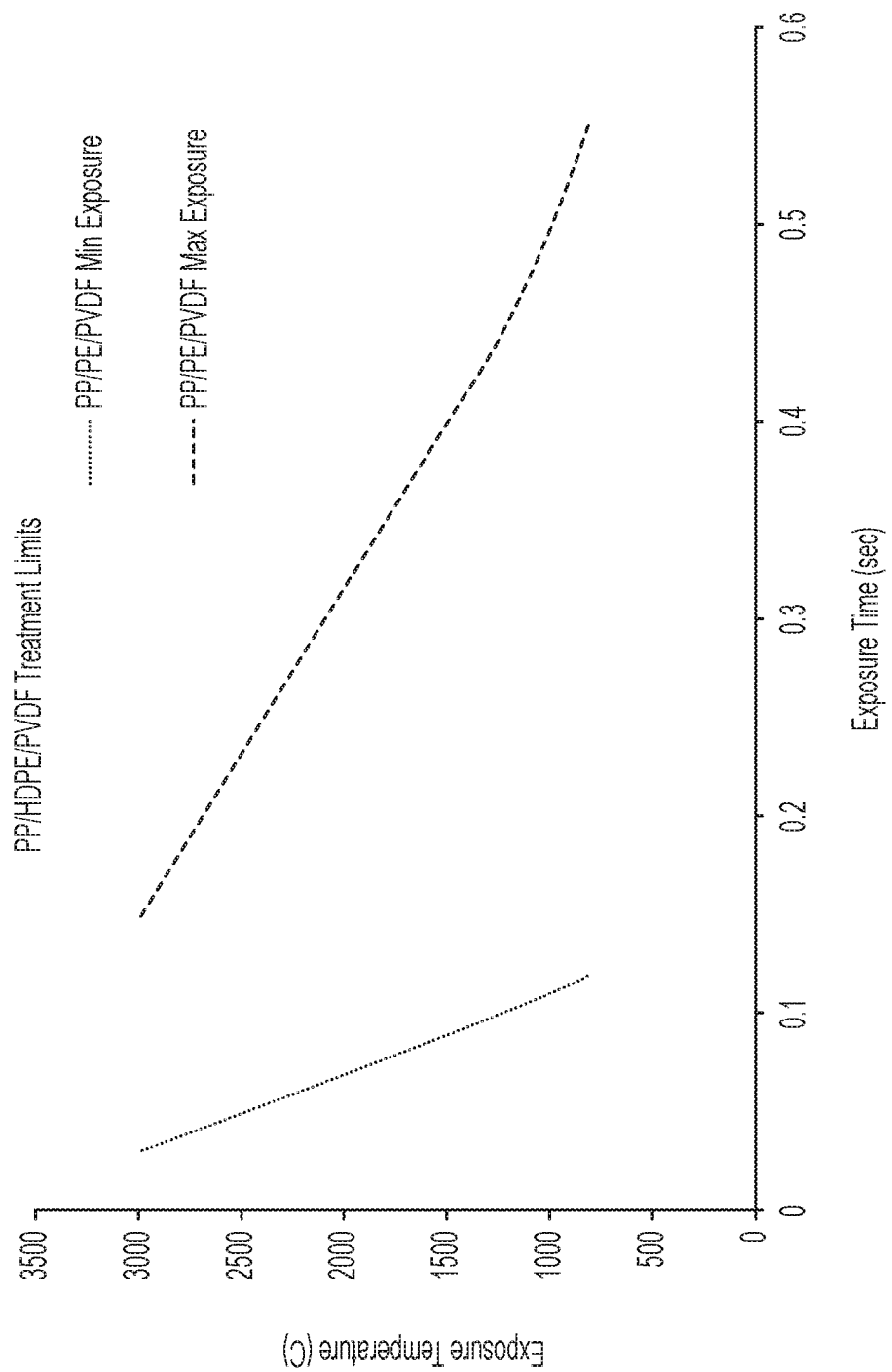
FIG. 22 is a plot of exposure time and exposure temperature of the data in Table 9.

The ranges of the above data are similarly plotted in FIG. 18 (for Table 4), FIG. 19 (for Table 5), FIG. 20 (for Table 6), FIG. 21 (for Table 7), and FIG. 22 (for Table 8).

As is noted above, it is believed that the polymers in the axial aligned state contribute significantly to the tensile strength of the fiber. It is also believed the polymers in the relaxed state contribute less to the tensile strength of the fiber. The change in tensile strength from the untreated, original cross sectional area fibers to the treated fibers with varied cross sectional area is an indication of the reduction of the degree of fiber in aligned state, which is believed to be proportional to the amount of varied cross sectional area. By measuring the tensile strength of treated and untreated fibers, and by measuring the change in tensile strength, one can calculate an estimate for the degree of cross sectional area variance. This information can be used to determine the degree of treatment for optimization of desired characteristics.

In Table 9, the tensile strength (in MPa) of fibers comprised of PP were tested before and after treatment, at different temperatures (F1, F2, and F3) each with three treatment times of T1, T2, and, T3. For treatment temperature F1 at 900 degrees Celsius, the treatment times were T1=0.18 seconds, T2=0.24 seconds, and T3=0.3 seconds. For treatment temperature F2 at 1200 degrees Celsius, the treatment times were T1=0.9 seconds, T2=0.12 seconds, and T3=0.15 seconds. For treatment temperature F3 at 1350 degrees Celsius, the treatment times were T1=0.06 seconds, T2=0.099 seconds, and T3=0.135 seconds. The change in tensile strength was used to calculate the estimated change in cross-sectional area.

TABLE 9

Cross-Sectional Reduction

| Sample | Control (Untreated) Tensile (MPa) | Treated Tensile (MPa) | Calculated Area Reduction (% of Untreated) |
|---|---|---|---|
| PP F1 T1 | 451 | 472 | −6% (increase) |
| PP F1 T2 | 484 | 402 | 16% |
| PP F1 T3 | 444 | 162 | 63% |
| PP F2 T1 | 443 | 412 | 6% |
| PP F2 T2 | 454 | 419 | 8% |
| PP F2 T3 | 436 | 388 | 11% |
| PP F3 T1 | 444 | 386 | 13% |
| PP F3 T2 | 411 | 319 | 18% |
| PP F3 T3 | 437 | 207 | 51% |

In Table 10, the peak pullout load of treated fiber is expressed as a percentage of the control peak pullout load for 0 degree pullout tests (along the axis of the fiber). In Table 11, the peak pullout load of treated fiber is expressed as a percentage of the control peak pullout load for 45 degree pullout tests (along the axis of the fiber). Values above 100% show an increase in peak pullout load for the treated fiber. Table 10 also shows the peak pullout load expressed as a percentage of the treated fibers own tensile strength which describes the efficiency of the fiber if the entire fiber was treated (i.e., the percentage of capacity developed by the pullout test). As described above, FIGS. 6-11 illustrate the pullout displacement (at both a zero degree angle and a 45 degree angle) in millimetres versus pullout load in Newtons for fibers comprised of PP treated at different temperatures (F1, F2, and F3) each with three treatment times of T1, T2, and, T3.

Results from table 10 and table 11 shows significant increases in pullout peak load can be attained with small levels of cross sectional reduction calculated in Table 9. For example, sample PP F1 T2 has only 16% reduction in cross sectional area, and only a relatively minor reduction tensile strength, but has a 367% increase in pullout peak load.

TABLE 10

Pull-Out Testing Results (0 deg pullout)

| Sample | Peak Pullout Load (% of Control) | % of treated Tensile Strength |
|---|---|---|
| PP F1 T1 | 169% | 21% |
| PP F1 T2 | 367% | 35% |
| PP F1 T3 | 256% | 91% |
| PP F2 T1 | 249% | 49% |
| PP F2 T2 | 247% | 56% |
| PP F2 T3 | 429% | 95% |
| PP F3 T1 | 380% | 84% |
| PP F3 T2 | 364% | 100% |
| PP F3 T3 | 307% | 58% |

TABLE 11

Pull-out Results (45 deg pullout)

| Sample | Peak Pullout Load (% of Control) | % of treated Tensile Strength |
|---|---|---|
| PP F1 T1 | 246% | 54% |
| PP F1 T2 | — | — |
| PP F1 T3 | — | — |
| PP F2 T1 | 277% | 58% |
| PP F2 T2 | 242% | 59% |

TABLE 11-continued

Pull-out Results (45 deg pullout)

| Sample | Peak Pullout Load (% of Control) | % of treated Tensile Strength |
|---|---|---|
| PP F2 T3 | — | — |
| PP F3 T1 | 325% | 77% |
| PP F3 T2 | — | — |
| PP F3 T3 | — | — |

In Table 12, the tensile strength (in MPa) of fibers comprised of HDPE and PP in a mixture percent of 25% HDPE to 75% PP tested before and after treatment, at different treatment temperatures (F1, F2, and F3) each with three treatment times of T1, T2, and, T3. For treatment temperature F1 at 900 degrees Celsius, the treatment times were T1=0.18 seconds, T2=0.24 seconds, and T3=0.105 seconds. For treatment temperature F2 at 1200 degrees Celsius, the treatment times were T1=0.9 seconds, T2=0.12 seconds, and T3=0.15 seconds. For treatment temperature F3 at 1350 degrees Celsius, the treatment times were T1=0.06 seconds, T2=0.105 seconds, and T3=0.12 seconds.

TABLE 12

Cross-Sectional Reduction and Fiber Pullout Results

| Sample | Control (Untreated) Tensile (MPa) | Treated Tensile (MPa) | Calculated Area Reduction (% of Untreated) |
|---|---|---|---|
| HDPE/PP F1 T1 | 543 | 524 | 3% |
| HDPE/PP F1 T2 | 564 | 545 | 3% |
| HDPE/PP F1 T3 | 551 | 245 | 54% |
| HDPE/PP F2 T1 | 557 | 524 | 6% |
| HDPE/PP F2 T2 | 545 | 473 | 18% |
| HDPE/PP F2 T3 | 541 | 333 | 38% |
| HDPE/PP F3 T1 | 538 | 455 | 13% |
| HDPE/PP F3 T2 | 544 | 264 | 51% |
| HDPE/PP F3 T3 | 543 | 242 | 55% |

In table 13, the peak pullout load of treated fiber is expressed as a percentage of the control peak pullout load for 0 degree pullout tests (along the axis of the fiber). In table 14, the peak pullout load of treated fiber is expressed as a percentage of the control peak pullout load for 45 degree pullout tests (along the axis of the fiber). Values above 100% show an increase in peak pullout load for the treated fiber. Table 14 also shows the peak pullout load expressed as a percentage of the treated fibers own tensile strength which describes the efficiency of the fiber if the entire fiber were treated (i.e., the percentage of capacity developed by the pullout test). As described above, FIGS. 12-17 illustrate the pullout displacement (at both a zero degree angle and a 45 degree angle) in millimeters versus pullout load in Newtons for fibers comprised of HDPE/PP fibers treated at different temperatures (F1, F2, and F3) each with three treatment times of T1, T2, and, T3.

Results from table 13 and table 14 shows significant increases in pullout peak load can be attained with small levels of cross sectional reduction calculated in Table 12. For example, sample HDPE/PP F1 T2 has only 3% reduction in cross sectional area, and only a relatively minor reduction tensile strength, but has a 325% increase in pullout peak load. There were several cases where the peak pullout load expressed as a % of treated fiber tensile strength was greater than 100% indicating the pullout load was higher than the tensile strength of the treated fiber. This appears counter intuitive, however, the pullout tests were not conducted in a continuously treated fiber, only 10 mm of the 25 mm embedment length was treated and the pullout load was applied on a untreated end outside the embedment area. In both cases the treatment caused more than 50% reduction in tensile strength at the treatment area therefore the untreated area was over twice the capacity of the treated area and capable supporting a pullout load move 100% of the treated area capacity.

TABLE 13

Pull-Out Testing Results (0 deg pullout)

| Sample | Peak Pullout Load (% of Control) | % of treated Tensile Strength |
|---|---|---|
| HDPE/PP F1 T1 | 133% | 11% |
| HDPE/PP F1 T2 | 325% | 15% |
| HDPE/PP F1 T3 | 375% | 38% |
| HDPE/PP F2 T1 | 350% | 43% |
| HDPE/PP F2 T2 | 375% | 50% |
| HDPE/PP F2 T3 | 454% | 84% |
| HDPE/PP F3 T1 | 375% | 52% |
| HDPE/PP F3 T2 | 508% | 120% |
| HDPE/PP F3 T3 | 504% | 127% |

TABLE 14

Pull-Out Testing Results (45 deg pullout)

| Sample | Peak Pullout Load (% of Control) | % of treated Tensile Strength |
|---|---|---|
| HDPE/PP F1 T1 | 135% | 15% |
| HDPE/PP F1 T2 | 323% | 49% |
| HDPE/PP F1 T3 | — | — |
| HDPE/PP F2 T1 | 297% | 47% |
| HDPE/PP F2 T2 | 368% | 64% |
| HDPE/PP F2 T3 | 377% | 90% |
| HDPE/PP F3 T1 | 400% | 72% |
| HDPE/PP F3 T2 | — | — |
| HDPE/PP F3 T3 | — | — |

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other fiber reinforced materials and fabrics, not necessarily the exemplary methods and apparatus generally described above. For example, the various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for making a fiber reinforcement with variations in transverse cross section, comprising:
   forming a fiber having a surface, a core, and a first transverse cross section, said fiber comprising axially aligned polymeric material having a melting point temperature, said polymeric material comprising one or more of polyethylene, polypropylene, nylon, polyester, and polyvinylidene difluoride;

exposing said fiber to a heat treatment temperature between 800° C. and 3,000° C. for between 0.015 seconds and 0.5 seconds, such that at least a portion of the polymeric material at or near the surface of said fiber is at or above the melting point temperature and the polymeric material at or near the core is below the melting point temperature, wherein said polymeric material above the melting point temperature becomes unaligned, forming at least one fiber area having a second transverse cross section greater than said first transverse cross section and at least one fiber area having a third transverse cross section less than said first transverse cross section; and cooling said fiber to a temperature below the melting point temperature.

2. The method of claim 1, wherein said heat treatment comprises one or more of a flame, moving hot air, hot fluid, a laser, an electronic treatment, and combinations thereof.

3. The method of claim 1, wherein said fiber reinforcements are composed of continuous filaments.

4. The method of claim 1, wherein said polymeric material is a polyolefin.

5. The method of claim 1, wherein the polymeric material is polypropylene.

6. The method of claim 1, wherein the polymeric material is polyethylene.

7. The method of claim 1, wherein the polymeric material is polyvinylidene difluoride.

8. The method of claim 1, wherein the polymeric material is a combination of polypropylene and polyethylene.

9. The method of claim 1, wherein said second cross section is up to about 150% larger than said first transverse cross section.

10. The method of claim 1, wherein said third cross section is reduced by less than 50% compared to the first cross section.

11. The method of claim 1, wherein said fiber has a peak pullout load increase of about 5% to 1000% over an otherwise identical fiber that has not been heat treated.

12. The method of claim 1, wherein said fiber has a peak pullout load increase of at least 100% over an otherwise identical fiber that has not been heat treated.

13. A heat-treated fiber for reinforcing concrete, said fiber comprising a polymeric material and further comprising a core portion, wherein the polymeric material is in a state of general axial alignment;

a surface portion, surrounding said core portion, wherein the polymeric material at the surface portion is in a randomly coiled state, forming ridge in the fiber surface, said ridge having a transverse cross section that is greater than the transverse cross section of the fiber without said ridge, and at least one groove in the fiber surface, said groove having a transverse cross section that is less than the transverse cross section of the fiber without said groove.

14. Concrete reinforced with heat treated fibers having variations in transverse cross section, said fibers comprising a polymeric material and further comprising:

a core portion, wherein the polymeric material is in a state of general axial alignment;

a surface portion, surrounding said core portion, wherein the polymeric material at the surface portion is in a randomly coiled state, forming at least one ridge in the fiber surface, said ridge having a transverse cross section that is greater than the transverse cross section of the fiber without said ridge, and at least one groove in the fiber surface, said groove having a transverse cross section that is less than the transverse cross section of the fiber without said groove.

15. A method for reinforcing concrete using fibers with variations in transverse cross section, comprising:

forming a fiber having a surface, a core, and a first transverse cross section, said fiber comprising axially aligned polymeric material having a melting point temperature said polymeric material comprising one or more of polyethylene, polypropylene, nylon, polyester, and polyvinylidene difluoride;

exposing said fiber to a heat treatment temperature between 800° C. and 3,000° C. for between 0.015 seconds and 0.5 seconds, such that at least a portion of the polymeric material at or near said surface of said fiber is at or above the melting point temperature and all of the polymeric material at or near the core is below the melting point temperature, wherein said polymeric material above the melting point temperature becomes unaligned, forming at least one fiber area having a second cross section greater than said first transverse cross section and at least one fiber area having a third transverse cross section less than said first transverse cross section; and cooling said fiber to a temperature below the melting point temperature.

* * * * *